US012155778B2

(12) United States Patent
Tarnow

(10) Patent No.: US 12,155,778 B2
(45) Date of Patent: *Nov. 26, 2024

(54) SYSTEMS AND METHODS FOR CORRELATING CRYPTOGRAPHIC ADDRESSES BETWEEN BLOCKCHAIN NETWORKS

(71) Applicant: CipherTrace, Inc., Purchase, NY (US)

(72) Inventor: Jacob Tarnow, Lost Gatos, CA (US)

(73) Assignee: CipherTrace, Inc., Menlo Park, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 17/883,829

(22) Filed: Aug. 9, 2022

(65) Prior Publication Data

US 2022/0385487 A1 Dec. 1, 2022

Related U.S. Application Data

(63) Continuation of application No. 17/562,417, filed on Dec. 27, 2021, now Pat. No. 11,438,175.
(Continued)

(30) Foreign Application Priority Data

Dec. 27, 2021 (WO) ................ PCT/US2021/065210

(51) Int. Cl.
*H04L 9/32* (2006.01)
*H04L 9/00* (2022.01)
*H04L 9/30* (2006.01)

(52) U.S. Cl.
CPC .......... *H04L 9/3252* (2013.01); *H04L 9/3066* (2013.01); *H04L 9/3236* (2013.01); *H04L 9/50* (2022.05); *H04L 2209/56* (2013.01)

(58) Field of Classification Search
None
See application file for complete search history.

(56) References Cited

U.S. PATENT DOCUMENTS 9,298,806 B1    3/2016   Vessenes et al.
9,635,000 B1    4/2017   Muftic
(Continued)

FOREIGN PATENT DOCUMENTS

CN     104320262 A      1/2015
CN     111709749 A   *   9/2020
(Continued)

OTHER PUBLICATIONS

Yousaf et al. "Tracing Transaction Across Cryptocurrency Ledgers" [online] Usenix, Aug. 2019 [retrieved Apr. 6, 2022]. Retrieved from the Internet: URL: https://www.usenix.org/system/files/sec19-yousaf_0.pdf (Year: 2019).*

(Continued)

*Primary Examiner* — Taghi T Arani
*Assistant Examiner* — Joshua Raymond White
(74) *Attorney, Agent, or Firm* — Barta Jones, PLLC

(57) ABSTRACT

Embodiments include systems and methods for determining cryptographic address for a same entity across a plurality of distributed blockchain networks that use a same elliptic curve. In some embodiments the method includes computing a cryptographic address hash of the first cryptographic address using the cryptographic public key of the first cryptographic address, the cryptographic address hash being a common representation of the first entity on the first distributed blockchain network and the cryptographic address hash being derived via a cryptographic one-way hash function, the cryptographic one-way hash function following a protocol of performing a function on the cryptographic public key, the cryptographic public key being
(Continued)

used on the first distributed blockchain network and a second distributed blockchain network, the first distributed blockchain network and the second distributed blockchain network using the same elliptic curve.

20 Claims, 16 Drawing Sheets

Related U.S. Application Data

(60) Provisional application No. 63/131,782, filed on Dec. 29, 2020.

(56) References Cited

U.S. PATENT DOCUMENTS

| | | | |
|---|---|---|---|
| 10,102,265 B1 | 10/2018 | Madisetti et al. | |
| 10,171,476 B2 | 1/2019 | Khan | |
| 10,891,694 B1 | 1/2021 | Leise et al. | |
| 11,206,137 B2 | 12/2021 | Yu et al. | |
| 11,251,937 B2 | 2/2022 | Jevans | |
| 2006/0184528 A1 | 8/2006 | Rodeh | |
| 2006/0248016 A1 | 11/2006 | Ginter et al. | |
| 2011/0251951 A1 | 10/2011 | Kolkowitz et al. | |
| 2012/0130853 A1 | 5/2012 | Petri | |
| 2013/0018796 A1 | 1/2013 | Kolhatkar et al. | |
| 2014/0047544 A1 | 2/2014 | Jakobsson | |
| 2015/0032625 A1 | 1/2015 | Dill et al. | |
| 2015/0318995 A1 | 11/2015 | Leggette et al. | |
| 2015/0332283 A1 | 11/2015 | Witchey | |
| 2015/0363769 A1 | 12/2015 | Ronca | |
| 2015/0381637 A1 | 12/2015 | Raff et al. | |
| 2016/0012465 A1 | 1/2016 | Sharp | |
| 2016/0071108 A1 | 3/2016 | Caldera et al. | |
| 2016/0217436 A1 | 7/2016 | Brama | |
| 2016/0261690 A1 | 9/2016 | Ford | |
| 2016/0283920 A1 | 9/2016 | Fisher et al. | |
| 2016/0283941 A1 | 9/2016 | Andrade | |
| 2016/0300227 A1 | 10/2016 | Subhedar et al. | |
| 2016/0300234 A1 | 10/2016 | Moss-Pultz et al. | |
| 2016/0330027 A1 | 11/2016 | Ebrahimi | |
| 2016/0342994 A1 | 11/2016 | Davis | |
| 2017/0005804 A1 | 1/2017 | Zinder | |
| 2017/0011460 A1 | 1/2017 | Molinari et al. | |
| 2017/0031676 A1 | 2/2017 | Cecchetti et al. | |
| 2017/0034197 A1 | 2/2017 | Daniel et al. | |
| 2017/0093830 A1 | 3/2017 | Wuehier | |
| 2017/0111175 A1 | 4/2017 | Oberhauser et al. | |
| 2017/0132620 A1 | 5/2017 | Miller et al. | |
| 2017/0132635 A1 | 5/2017 | Caldera | |
| 2017/0132636 A1 | 5/2017 | Caldera | |
| 2017/0206604 A1 | 7/2017 | Al-Masoud | |
| 2017/0214701 A1 | 7/2017 | Hasan | |
| 2017/0236094 A1 | 8/2017 | Shah | |
| 2017/0250972 A1* | 8/2017 | Ronda | H04L 9/0891 |
| 2017/0270534 A1 | 9/2017 | Zoldi et al. | |
| 2017/0293669 A1 | 10/2017 | Madhavan et al. | |
| 2017/0316390 A1 | 11/2017 | Smith et al. | |
| 2017/0330180 A1 | 11/2017 | Song et al. | |
| 2017/0344988 A1 | 11/2017 | Cusden et al. | |
| 2017/0352116 A1 | 12/2017 | Pierce et al. | |
| 2017/0366348 A1 | 12/2017 | Weimer et al. | |
| 2018/0006825 A1 | 1/2018 | Smith et al. | |
| 2018/0018723 A1 | 1/2018 | Nagla et al. | |
| 2018/0039667 A1 | 2/2018 | Pierce et al. | |
| 2018/0082256 A1 | 3/2018 | Tummuru et al. | |
| 2018/0089256 A1 | 3/2018 | Wright, Sr. | |
| 2018/0109541 A1 | 4/2018 | Gleichauf | |
| 2018/0137306 A1 | 5/2018 | Brady et al. | |
| 2018/0183606 A1 | 6/2018 | High et al. | |
| 2018/0211038 A1 | 7/2018 | Breiman et al. | |
| 2018/0219671 A1 | 8/2018 | Velissarios et al. | |
| 2018/0240107 A1* | 8/2018 | Andrade | G06Q 20/065 |
| 2018/0253702 A1 | 9/2018 | Dowding | |
| 2018/0276666 A1 | 9/2018 | Haldenby et al. | |
| 2018/0285879 A1 | 10/2018 | Gadnis et al. | |
| 2018/0330385 A1 | 11/2018 | Johnson et al. | |
| 2018/0331835 A1 | 11/2018 | Jackson | |
| 2019/0018888 A1 | 1/2019 | Madisetti et al. | |
| 2019/0057362 A1 | 2/2019 | Wright | |
| 2019/0081961 A1 | 3/2019 | Bansal | |
| 2019/0132350 A1 | 5/2019 | Smith et al. | |
| 2019/0156301 A1 | 5/2019 | Bentov et al. | |
| 2019/0164156 A1 | 5/2019 | Lindemann | |
| 2019/0196899 A1 | 6/2019 | Sylvester, II et al. | |
| 2019/0199535 A1 | 6/2019 | Falk | |
| 2019/0229892 A1 | 7/2019 | Jevans | |
| 2019/0245699 A1 | 8/2019 | Irwan et al. | |
| 2019/0279215 A1 | 9/2019 | Kuchar | |
| 2019/0354725 A1 | 11/2019 | Lowagie | |
| 2019/0373797 A1 | 12/2019 | Jevans et al. | |
| 2020/0160344 A1 | 5/2020 | Jevans et al. | |
| 2020/0162485 A1 | 5/2020 | Jevans et al. | |
| 2020/0167779 A1 | 5/2020 | Carver et al. | |
| 2020/0202358 A1* | 6/2020 | McClelland | G06Q 20/3827 |
| 2020/0035127 A1 | 11/2020 | Jevans et al. | |
| 2021/0006399 A1 | 1/2021 | Lee | |
| 2021/0075592 A1 | 3/2021 | Zhuo | |
| 2021/0084005 A1* | 3/2021 | Khan | H04L 9/3247 |
| 2022/0092587 A1 | 3/2022 | Jevans | |

FOREIGN PATENT DOCUMENTS

| | | | |
|---|---|---|---|
| CN | 112737771 A * | 4/2021 | |
| EP | 2884441 A1 | 9/2021 | |
| EP | 3884411 A1 | 9/2021 | |
| GB | 2593647 A1 | 9/2021 | |
| GB | 2594396 A1 | 10/2021 | |
| WO | WO2019071458 A1 | 4/2019 | |
| WO | WO2019144042 A1 | 7/2019 | |
| WO | WO219231772 A1 | 12/2019 | |
| WO | WO2020010279 A1 | 1/2020 | |
| WO | WO2020106638 A1 | 5/2020 | |
| WO | WO2020106639 A1 | 5/2020 | |

OTHER PUBLICATIONS

Quesnelle "On the linkability of Zcash transactions" [online] University of Michigan—Dearborn, Dec. 2017 [retrieved Apr. 6, 2022]. Retrieved from the Internet: URL: https://arxiv.org/pdf/1712.01210.pdf (Year: 2017).*

Kim, Harry, "International Search Report and the Written Opinion of the International Searching Authority", International Application No. PCT/US2021/065210, mailed Jun. 9, 2022, 7 pages.

Davila et al., "The Blockchain in IoT", Chapter 10, Rayes et al., "Internet of Things From Hype to Reality", 2019, ISB 978-3-319-99515-1, pp. 269-296.

Kun, J., "Optimism in the Face of Uncertainty: the UCB1 Algorithm," [online] Oct. 28, 2013 [retrieved Jun. 9, 2021]; Retrieved from the Internet <https:iijerernykun.corn/2013/10/28/optimism-in-the-face-of-uncertainty-the-ucb1-algorithm/>, 17 pages.

Prasad, Aditya, "Lessons From Implementing AlphaZero," [online] Jun. 5, 2018 [retrieved Jun. 9, 2021]; Retrieved from the Internet: <https://medium.com/oraclede vs/lessons-from-implementing-alphazero-7e36e9054191 >, 4 pages.

Chaum, D., "Blind signatures for untraceable payments" in Chaum D., Rivest R.L., Sherman A.T. (eds) Advances in Cryptology Proceedings of Crypto 82, 1983, pp. 199-203.

Biryukov, A., et al., "Deanonymisation of clients in Bitcoin P2P network", In Proceedings of the 2014 ACM SIGSAC Conference on Computer and Communications Security (2014), ACM, pp. 15-29 , 15 pages.

M. Fleder, M. S. Kester, S. Pillai, Bitcoin Transaction Graph Analysis, CoRR, vol. abs/1502.01657, 2015, [online] Available: http://arxiv.org/abs/1502.01657, 8 pages.

Moser M., et al. "An inquiry into money laundering tools in the Bitcoin ecosystem", IEEE eCrime Researchers Summit (eCRS), 2013, 14 pages.

Meiklejohn, S., et al. "A Fistful of Bitcoins: Characterizing Payments Among Men with No Names", IMC, 2013, 13 pages.

(56) References Cited

OTHER PUBLICATIONS

F. Reid and M. Harrigan, "An analysis of anonymity in the Bitcoin system," in Privacy, security, risk and trust (PASSAT), 2011 IEEE Third International Conference on Social Computing (social.com). IEEE, 2011, pp. 1318-1326.
"International Search Report" and "Written Opinion of the International Searching Authority," Patent Cooperation Treaty Application No. PCT/US2019/014346, Apr. 22, 2019, 6 pages.
"International Search Report" and "Written Opinion of the International Searching Authority," Patent Cooperation Treaty Application No. PCT/US2019/033399, Aug. 1, 2019, 8 pages,.
Chaum, David Lee, "Computer Systems Established, Maintained, and Trusted by Mutually Suspicious Groups," Dissertation, Department of Computer Science, University of California, Berkeley, May 22, 1982, 96 pages.
"International Search Report" and "Written Opinion of the International Searching Authority," Patent Cooperation Treaty Application No. PCT/US2019/062047, Jan. 24, 2020, 13 pages.
"International Search Report" and "Written Opinion of the International Searching Authority," Patent Cooperation Treaty Application No. PCT/US2019/062049, Jan. 27, 2020, 10 pages.
Kharraz Amin et al., "Cutting the Gordian Knot: A Look under the Hood of Ransomware Attacks"; International Conference on Detection of Intrusions and Malware, and Vulnerability Assessment, Jun. 23, 2015 [retrieved Jan. 5, 2020]; Retrieved from the internet: <littp://193.55. •114.1/docs/dimva15_ransomware.pdf>, 28 pages.
Ye et al., "Alt-Coin Traceability," May 18, 2020 [retrieved May 25, 2021], Retrieved from the Internet: < https//eprint.iacr.org/2020/593>, 24 pages.
Van Saberhagen, "CryptoNote v 2.0," Oct. 17, 2013 [retrieved May 25, 2021]; Retrieved from the Internet: <https://www.google.com/url? sa=t&rct=j&q=&esrc=s&source=web&cd=&ved=2ahUKEwjKnqCY1eXwAhUFCjQIHXcOD_ 4QFjAAegQIAxAD&url=http s%3A%2F%2Fbytecoin.org0/.02Fold%2Fwhitepaper.pdf&usg=AOvVaw2WPuLQEPBjsZIPvUdROfmW>, 20 pages.
Biryukov et al, "Deanonymisation of clients in Bitcoin P2P network," Jul. 5, 2014, [retrieved May 25, 2021]; Retrieved from the Internet: <https://arxiv.org/abs/1405.7 4183>, 15 pages.
Fleder et al., "Bitcoin Transaction Graph Analysis," Feb. 5, 2015 [retrieved May 25, 2021]; Retrieved from the Internet: <https://a1xiv org/abs/1502.01657>, 8 pages.
Moser et al., "An Inquiry into Money Laundering Tools in the Bitcoin Ecosystem," 2013 [retrieved May 25, 2021]; Retrieved from the Internet: <https://www.google.com/uri? sa=t&rct:::j&q=&esrc=s&source=web&cd:::&ved=2ahUKEwjbnrXL 1 uXwAhU3JjQIHZDLCv0QFjADegQICBAD&url=https%3A%2F%2F maltemoeser.de%2Fpaper%2Fmoney-laundering. pdf&usg=AOvVawOta6LuCqs YGaknzl NjyRsD>, 14 pages.
Meiklejohn et al., "A Fistful of Bitcoins: Characterizing Payments Among Men with No Names," 2013 [retrieved May 25, 2021]; Retrieved from the Internet: <https://www.google.com/uri? sa=t&rct:::j&q=&esrc=s&source=web&cd:::&ved=2ah U KEwjah Nq i 1-XwAh U Kgdqi HecoC ___ 0QFjACegQ IAxAD&u rl=https%3A%2F%2Fcseweb.uc:sd.eclu%2F~smeiklejotln%2Ffiles%2Fimc13.pdf&usg=AOvVaw191MVZQrG6hey605n-ftFH>, 13 pages.
Reid et al., "An Analysis of Anonymity in the Bitcoin System," Jul. 22, 2011 [retrieved May 25, 2021]; Retrieved from the Internet <https://arxiv.org/abs/1107 .4524>, 30 pages.
Welsh, Noel, "Bandit Algorithms Continued UCB1," Nov. 9, 2010; 17 pages.
Yousaf et al. "Tracing Transaction Across Cryptocurrency Ledgers" [online] Usenix, Aug. 2019 [retrieved Apr. 6, 2022]. Retrieved from the Internet: URL: https://www.usenix.org/system/files/sec19-yousaf_O.pdf (Year: 2019), 14 pages.
Quesnelle "On the linkability of Zcash transactions" [online] University of Michigan—Dearborn, Dec. 2017 [retrieved Apr. 6, 2022 ]. Retrieved from the Internet: URL: https://arxiv.org/pdf/1712.01210.pdf (Year: 2017), 5 pages.

\* cited by examiner

SYSTEMS AND METHODS FOR CORRELATING CRYPTOGRAPHIC ADDRESSES BETWEEN BLOCKCHAIN NETWORKS

CROSS REFERENCE TO RELATED APPLICATIONS

This application is a continuation of U.S. patent application Ser. No. 17/562,417 filed Dec. 27, 2021, which is a national stage application under 35 U.S. Code § 371 which claims the benefit of International Application No. PCT/US21/065210 filed Dec. 27, 2021 and claims the priority benefit of U.S. Provisional Patent Application No. 63/131,782, filed Dec. 29, 2020. The aforementioned disclosures are hereby incorporated by reference in their entirety including all references cited therein.

FIELD OF THE TECHNOLOGY

Embodiments of the disclosure relate to correlating cryptographic addresses between blockchain networks. In particular, the present disclosure relates to correlating different cryptographic addresses on the same entity across a plurality of blockchain networks.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Since the early days of its inception, blockchain based networks have held a pseudonymous nature of identity that leads to a trustless network with the addition of ease and speed of global exchange. From Bitcoin to the other cryptocurrencies thereafter, these networks sometimes attract unsavory characters to partake in illicit purposes while using these cryptocurrencies as an exchange of value. Due to the desire to protect common users of these technologies, law enforcement, governments, and a handful of private companies have been on a quest to identify and trace the addresses used for illegal and illicit activities. Traditionally these efforts have been focused within the boundaries of their respective blockchain networks. Yet, as cryptographic transactions are now starting to branch blockchains with the rise of interoperability, there is a need to correlate different cryptographic addresses across multiple blockchain networks. Therefore, there is a need for correlating addresses in different networks controlled by the same entity as a way to trace value through multiple blockchain swaps, hops, and traversals.

SUMMARY

According to some embodiments, the present technology is directed to determining cryptographic address for a same entity across a plurality of distributed blockchain networks that use a same elliptic curve. In some aspects, the techniques described herein relate to a system, including: one or more hardware processors configured by machine-readable instructions to: receive first distributed blockchain network data, the first distributed blockchain network data including a first cryptographic address of a first entity on a first distributed blockchain network; extract a cryptographic public key of the first cryptographic address as a function of a scripting language and a cryptographic recovery principle; receive second distributed blockchain network data, the second distributed blockchain network data including a second cryptographic address on a second distributed blockchain network; compute a cryptographic address hash of the first cryptographic address using the cryptographic public key of the first cryptographic address, the cryptographic address hash be a common representation of the first entity on the first distributed blockchain network and the cryptographic address hash being derived via a cryptographic one-way hash function, the cryptographic one-way hash function following a protocol of performing a function on the cryptographic public key, the cryptographic public key being used on the first distributed blockchain network and a second distributed blockchain network, the first distributed blockchain network and the second distributed blockchain network using the same elliptic curve; and correlate the first cryptographic address of the first entity to the second cryptographic address using the cryptographic address hash of the first cryptographic address, the correlating indicate that the second cryptographic address is of the first entity.

In some aspects, the techniques described herein relate to a system, wherein the one or more hardware processors are further configured by machine-readable instructions to: generate a plurality of ancillary cryptographic addresses using parameters, the parameters include: a script pattern, the cryptographic public key, hash160, address hash, and cryptographic address type.

In some aspects, the techniques described herein relate to a system, wherein the first distributed blockchain network and the second distributed blockchain network include one or more of cryptocurrency-based networks, virtual assets, virtual currencies, digital currencies, and cryptographic ledgers.

In some aspects, the techniques described herein relate to a system, wherein the one or more hardware processors are further configured by machine-readable instructions to: derive a common cryptographic key pair of the first cryptographic address and of the second cryptographic address; and determine a plurality of cryptographic address generated from the cryptographic key pair by determining a connection to one or more cryptographic addresses on a plurality of other blockchains networks, the plurality of other blockchains networks sharing the common cryptographic key pair.

In some aspects, the techniques described herein relate to a system, wherein the one or more hardware processors are further configured by machine-readable instructions to: deploy a node to the first distributed blockchain network for receiving the first distributed blockchain network data.

In some aspects, the techniques described herein relate to a system, wherein the one or more hardware processors are further configured by machine-readable instructions to: generate a database of cross-blockchain network of cryptographic addresses for the first entity, the database of cross-blockchain network of cryptographic addresses for the first entity enabling clustering, associations, and probabilistic determinations about the entity.

In some aspects, the techniques described herein relate to a system, wherein the one or more hardware processors are further configured by machine-readable instructions to: trace illicit activity that travels through the first distributed blockchain network and the second distributed blockchain network using the database of cross-blockchain network of cryptographic addresses for the first entity, the illicit activity being a transfer of funds for an illegal reason.

In some aspects, the techniques described herein relate to a non-transient computer-readable storage medium including instructions being executable by one or more processors to perform a method, the method including: receiving first distributed blockchain network data, the first distributed blockchain network data including a first cryptographic address of a first entity on a first distributed blockchain network; extracting a cryptographic public key of the first cryptographic address as a function of a scripting language and a cryptographic recovery principle; receiving second distributed blockchain network data, the second distributed blockchain network data including a second cryptographic address on a second distributed blockchain network; computing a cryptographic address hash of the first cryptographic address using the cryptographic public key of the first cryptographic address, the cryptographic address hash being a common representation of the first entity on the first distributed blockchain network and the cryptographic address hash being derived via a cryptographic one-way hash function, the cryptographic one-way hash functioning following a protocol of performing a function on the cryptographic public key, the cryptographic public key being used on the first distributed blockchain network and a second distributed blockchain network, the first distributed blockchain network and the second distributed blockchain network using the same elliptic curve; and correlating the first cryptographic address of the first entity to the second cryptographic address using the cryptographic address hash of the first cryptographic address, the correlating indicating that the second cryptographic address is of the first entity.

In some aspects, the techniques described herein relate to a computer-readable storage medium, wherein the at least one memory and the computer program code are further configured to, with the processor, cause the computer-readable storage medium to generate a plurality of ancillary cryptographic addresses using parameters, the parameters include: a script pattern, the cryptographic public key, hash160, address hash, and cryptographic address type.

In some aspects, the techniques described herein relate to a computer-readable storage medium, wherein the first distributed blockchain network and the second distributed blockchain network include one or more of cryptocurrency-based networks, virtual assets, virtual currencies, digital currencies, and cryptographic ledgers.

In some aspects, the techniques described herein relate to a computer-readable storage medium, wherein the at least one memory and the computer program code are further configured to, with the processor, cause the computer-readable storage medium to derive a common cryptographic key pair of the first cryptographic address and of the second cryptographic address; and determine a plurality of cryptographic address generated from the cryptographic key pair by determining a connection to one or more cryptographic addresses on a plurality of other blockchains networks, the plurality of other blockchains networks sharing the common cryptographic key pair.

In some aspects, the techniques described herein relate to a computer-readable storage medium, wherein the at least one memory and the computer program code are further configured to, with the processor, cause the computer-readable storage medium to deploy a node to the first distributed blockchain network for receiving the first distributed blockchain network data.

In some aspects, the techniques described herein relate to a computer-readable storage medium, wherein the at least one memory and the computer program code are further configured to, with the processor, cause the computer-readable storage medium to generate a database of cross-blockchain network of cryptographic addresses for the first entity, the database of cross-blockchain network of cryptographic addresses for the first entity enabling clustering, associations, and probabilistic determinations about the entity.

In some aspects, the techniques described herein relate to a computer-readable storage medium, wherein the at least one memory and the computer program code are further configured to, with the processor, cause the computer-readable storage medium to trace illicit activity that travels through the first distributed blockchain network and the second distributed blockchain network using the database of cross-blockchain network of cryptographic addresses for the first entity, the illicit activity being a transfer of funds for an illegal reason.

In some aspects, the techniques described herein relate to a method for determining cryptographic address for a same entity across a plurality of distributed blockchain networks that use a same elliptic curve, the method including: receiving first distributed blockchain network data, the first distributed blockchain network data including a first cryptographic address of a first entity on a first distributed blockchain network; extracting a cryptographic public key of the first cryptographic address as a function of a scripting language and a cryptographic recovery principle; receiving second distributed blockchain network data, the second distributed blockchain network data including a second cryptographic address on a second distributed blockchain network; computing a cryptographic address hash of the first cryptographic address using the cryptographic public key of the first cryptographic address, the cryptographic address hash being a common representation of the first entity on the first distributed blockchain network and the cryptographic address hash being derived via a cryptographic one-way hash function, the cryptographic one-way hash function following a protocol of performing a function on the cryptographic public key, the cryptographic public key being used on the first distributed blockchain network and a second distributed blockchain network, the first distributed blockchain network and the second distributed blockchain network using the same elliptic curve; and correlating the first cryptographic address of the first entity to the second cryptographic address using the cryptographic address hash of the first cryptographic address, the correlating indicating that the second cryptographic address is of the first entity.

In some aspects, the techniques described herein relate to a method, further including generating a plurality of ancillary cryptographic addresses using parameters, the parameters including: a script pattern, the cryptographic public key, hash160, address hash, and cryptographic address type.

In some aspects, the techniques described herein relate to a method, wherein the first distributed blockchain network and the second distributed blockchain network include one or more of cryptocurrency-based networks, virtual assets, virtual currencies, digital currencies, and cryptographic ledgers.

In some aspects, the techniques described herein relate to a method, further including: deriving a common cryptographic key pair of the first cryptographic address and of the second cryptographic address; and determining a plurality of cryptographic address generated from the cryptographic key pair by determining a connection to one or more cryptographic addresses on a plurality of other blockchains networks, the plurality of other blockchains networks sharing the common cryptographic key pair.

In some aspects, the techniques described herein relate to a method, further including generating a database of cross-blockchain network of cryptographic addresses for the first entity, the database of cross-blockchain network of cryptographic addresses for the first entity enabling clustering, associations, and probabilistic determinations about the entity.

In some aspects, the techniques described herein relate to a method, further including tracing illicit activity that travels through the first distributed blockchain network and the second distributed blockchain network using the database of cross-blockchain network of cryptographic addresses for the first entity, the illicit activity being a transfer of funds for an illegal reason.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

DETAILED DESCRIPTION

Figure 1:
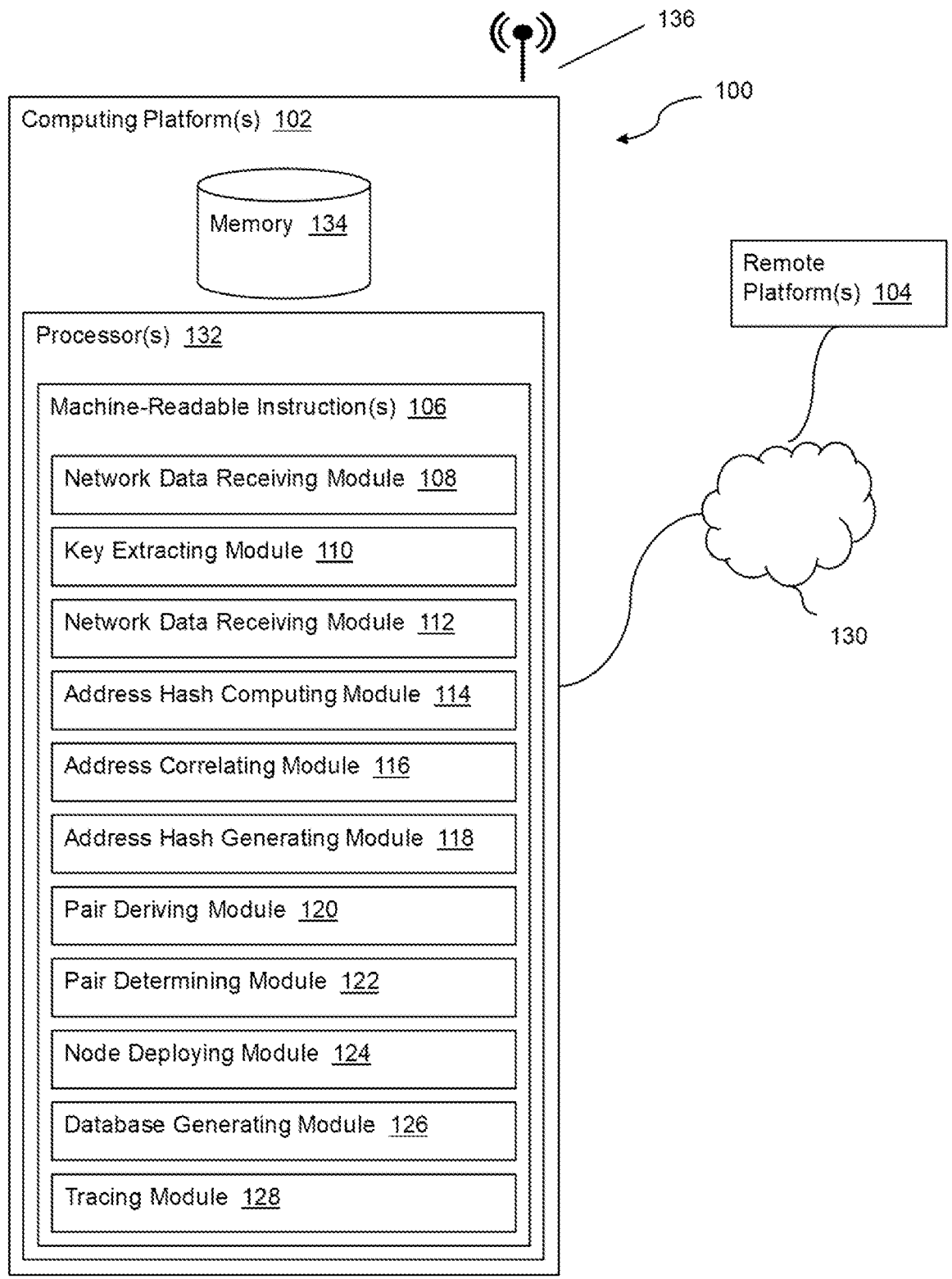
FIG. 1 illustrates a system configured for determining cryptographic address for a same entity across a plurality of distributed blockchain networks that use a same elliptic curve, according to exemplary embodiments of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure. It should be understood that the disclosed embodiments are merely exemplary of the invention, which may be embodied in multiple forms. Those details disclosed herein are not to be interpreted in any form as limiting, but as the basis for the claims.

In various embodiments the present technology includes systems and methods for correlating cryptographic address hashes in one or more distributed blockchain networks such as: cryptocurrency-based networks, virtual assets, virtual currencies, digital currencies, cryptographic ledgers, which share the same cryptographic public and private key pairs. Independent of the style of network (e.g., permissionless, permissioned, or consortium) these key derivations use transformations involving one or more cryptographic hash functions that result in different human-readable public addresses. Through the use of systems and methods of the present technology an association of a set of public addresses to a given cryptographic key across multiple networks may be made.

Systems and methods of the present technology enable correlating addresses in different networks controlled by the same entity through their public and private cryptographic key pairs and for its applications as a way to associate cross blockchain boundaries in various embodiments. Furthermore, the present technology serves as a way to trace value through multiple blockchain swaps, hops, and traversals in various embodiments.

In various embodiments the present technology may incorporate the following the following patents and patent applications that are incorporated by reference herein in their entireties including all references cited therein for all purposes. WIPO Patent Application No. WO2019071458A1, titled "Method and system for tracking user public key in cryptocurrency conditions" provides systems for tracking user public key in cryptocurrency conditions. CN Patent Application No. CN104320262A, titled "User public key address binding, searching and verifying method and system based on crypto currency open account book technology" provides a user public key address binding, searching, and verifying method. U.S. Pat. No. 11,206,137, titled "Providing high availability computing service by issuing a certificate" provides a providing a high availability computing service in a distributed system. U.S. Patent Application Publication No. US20170344988A1, titled "System and method for facilitating blockchain-based validation" provides a blockchain-based validation of a bearer of a private key used to register a record on a blockchain. WIPO Patent Application No. WO2020010279A1, titled "Systems and methods for blockchain addresses and owner verification" and provides methods for secure blockchain transactions. U.S. Patent Application Publication No. US2019279215A1, titled "Blockchain transaction safety" provides a labeling a set of the blockchain addresses as fraudulent and generating a graph data structure based on the blockchain data for transaction safety. All of the aforementioned disclosures are hereby incorporated by reference in their entireties for all purposes including all references cited therein.

In some embodiments, a majority of blockchain networks are composed of various cryptographic principles to ensure soundness, security, efficiency, and scalability. The foundation of these principles lies within the public and private key pairs that users hold and employ within a distributed network. Most users will use a specific key pair per network; however, this is not always the case. With the use of hierarchical deterministic wallet software, simplified payment verification, and the habitual use of common cryptographic elliptic curves, one can use the same key pair for multiple blockchains. In order to associate identifiable information across multiple blockchains, the present technology gains the respective cryptographic keys via exposed patterns that allows ascertaining of the necessary parameters for computing specific blockchain-based cryptographic address hashes. With the correlation of multiple cryptographic address hashes across multiple blockchains, the present technology enables tracing activity that travels through different networks and yet is still derived from a common cryptographic key pair. The common representation of an entity on a given blockchain is by their address hash. The address hash is derived via a cryptographic one-way hash function. The hash function follows a protocol by performing a function on a cryptographic public key. The public key may be used on multiple blockchain networks that use the same elliptic curve. Thus, any address generated from this public key has a connection to one or more addresses on any number of other blockchains that share this cryptographic key pattern. Using systems of the present technology, extraction of the public key is completed for any given address and computation of any number of address hashes that could be derived from the public key. By executing methods of the present technology, a correlation that an address on one network is synonymous with a given address on another network is made due to the mathematical principles of public key cryptography. Thus, systems of the present technology, over time build out a cross-blockchain network of addresses for a single entity that can lead to further clustering, associations and probabilistic determinations in various embodiments.

In some embodiments, the ownership and connection of an entity to a cryptocurrency asset or message is via cryptographic keys. More specifically asymmetric keys which yield a public and private key pair. The use of a public and private key pair enables a user or group of users to generate and manage funds tied to a multitude of derived address hashes.

In some embodiments, the generation of the keys themselves take place through a key-generation algorithm. Most blockchains and distributed cryptocurrency networks employ the use of elliptic curve multiplication to derive a public key from a private key and often they also use the same elliptic curve. Thus, a user (e.g., an entity) of one private key on a single blockchain could use the same key on a different blockchain network.

In some embodiments, with blockchains and distributed networks maturing, the exposure of these public keys is not as noticeable as a person of ordinary skill in the art may think. The common format of displaying public keys on blockchain networks is through cryptographic address hashes. In order to compute an address hash, the public key is put through a one-way cryptographic hash function and then encoded. However, at a deeper level, the protocol implementation exposes those public keys. Blockchains and distributed ledger-based networks usually encompass the act of transactional payments through two different models. These models are Unspent Transaction Output (UTXO) model and Account based model.

UTXO (Unspent Transaction Output) Model.

In some embodiments, for UTXO-model blockchains, transactions are linked together through their outputs. To ensure that transactions are valid, these networks utilize a scripting language to lock and unlock outputs to be spent. Every node on the network will validate transactions by executing these locking and unlocking scripts. Each input (i.e., spend) of a given cryptocurrency contains an unlocking script which refers to the previous UTXO. Each output (e.g., UTXO) contains a locking script. As a node verifies a transaction, the node takes both the locking and unlocking scripts and ensures that the unlocking script satisfies the locking scripts conditions. The evaluation and validation of the two scripts returns true if and only if the unlocking script has a valid signature from the private key of the recipient that corresponds to the hashed public key. Furthermore, the unlocking script contains the digital signature and public key. The digital signature itself proves that the owner of the private key used is the owner of the funds being spent, that the transaction cannot be modified, and that the proof of authorization is indisputable. Thus, with the corresponding public key exposed in a spend it can be guaranteed that the public key associated to the spend of a given address hash owns and controls the spend.

In various embodiments, with public keys being exposed in inputs for UTXO-model blockchains, the present technology enables relating hash160s exposed in corresponding outputs. There are some public keys in older outputs, however the most common parameter in outputs is a hash160. A hash160 is a cryptographic hash of a public key through the use of a one-way cryptographic hash function and cryptographic message digest which can be used by anyone to create a hash160 of a given public key. If all that is available is the hash160 and no public key, then one can take the cryptographic hash160 and extract the binary data. By adding a two-byte prefix, known as the version byte to the binary data, a cross-blockchain equivalent address representation may be generated. A human-readable address hash representation is created by applying a character-based encoding to this binary address.

Account Based Block Chain Model.

In some embodiments, for Account-based blockchains, transactions are not linked together through the spending of outputs. Account-based blockchains are similar to normal legacy banking accounts. A transaction in an account-based blockchain is nothing more than a sending/transfer of funds from one address to another. In addition to representing transactions differently, most address hashes are solely the last twenty bytes of the cryptographic one-way hash of the public key represented in a hexadecimal format. However, signing transactions are done the same way and usually with the same type of digital signature and elliptic curve as in UTXO-models. Signing transactions in Account-based model blockchains uses a digital signature generated from the keys and parameters established during the key-generation algorithm. The transaction contains three new parameters which can be used to recover the public key of the sender.

In some embodiments, the present technology in various embodiments consumes only five parameters that are used to build out a cross-blockchain correlation for a given address hash and/or public key. These parameters are Script Pattern, Public Key(s), Hash160, AddressHash, and Address Type.

In various embodiments, for UTXO-based networks, the present technology identifies the script pattern and extracts certain parameters when an address is either depositing funds or spending funds. These parameters include: one or more public keys itself, the corresponding hash160 for the address, the address hash, and address type. Note that present disclosure outlines that there may be one or more public keys. With the rise of privacy, some users may use multiple signature addresses which use multiple public keys to derive a single address. These addresses still fall in line with the implemented scripting language and are consumed by the present technology. If systems of the present technology consume the public key for a given address, then any possible address that is controlled by that key may be computed via the one-way cryptographic hash function supported by the given blockchain to generate addresses from public keys. If systems of the present technology consume the cryptographic hash160 of the address, the binary data is extracted to be used to compute any possible other address types across blockchains.

In various embodiments, for Account-based networks, the present technology derives public keys through a recovery mechanism when a given address hash is spending funds. Furthermore, with the systems described herein, the act of computing any possible other address types across blockchains consumes Account-based networks as well. By utilizing both UTXO-based and Account-based protocols at a given point, systems and methods of the present technology ascertain all five parameters (i.e., Script Pattern, Public Key(s), Hash160, AddressHash, and Address Type) for a given private key. Thus, over time, systems of the present technology may build cross-blockchain connections and clusters that associate users across any number of networks. Examples of how the Present Technology May be Used.

In some embodiments, systems and methods of the present technology for correlating cryptographic address hashes between a plurality of blockchain networks may be deployed as a tool to associate cryptographic keys and cryptographic addresses across multiple blockchain based networks in real-time. By implementing systems and methods of the present technology across multiple blockchains, and then feeding the resulting computed data into a service, the present technology enables generation of an infinite number of cryptographic address hashes that have either been used on a blockchain already or will be used in the future. From this computed data, systems and methods of the present technology build out a network of cross-chain equivalents for entities. As blockchain technology iterates and becomes one of the forefront technologies used in the mainstream, systems and methods of the present technology may be used to combat exploitation, attacks, and illicit activity as the illicit activity jumps from one blockchain network to another blockchain network via new interoperability mechanisms and cross-chain swaps.

FIG. 1 illustrates a system configured for determining cryptographic address for a same entity across a plurality of distributed blockchain networks that use a same elliptic curve, in accordance with one or more embodiments. In some cases, system 100 may include one or more computing platforms 102. The one or more computing platforms 102 may be communicably coupled with one or more remote platforms 104. In some cases, users may access the system 100 via remote platform(s) 104.

The one or more computing platforms 102 may be configured by machine-readable instructions 106. Machine-readable instructions 106 may include modules. The modules may be implemented as one or more of functional logic, hardware logic, electronic circuitry, software modules, and the like. The modules may include one or more of network data receiving module 108, key extracting module 110, network data receiving module 112, address hash computing module 114, address correlating module 116, address hash generating module 118, pair deriving module 120, pair determining module 122, node deploying module 124, database generating module 126, tracing module 128, and/or other modules.

Network data receiving module 108 may be configured to receive first distributed blockchain network data, the first distributed blockchain network data comprising a first cryptographic address of a first entity on a first distributed blockchain network. Key extracting module 110 may be configured to extract a cryptographic public key of the first cryptographic address as a function of a scripting language and a cryptographic recovery principle. Network data receiving module 112 may be configured to receive second distributed blockchain network data, the second distributed blockchain network data comprising a second cryptographic address on a second distributed blockchain network. Address hash computing module 114 may be configured to compute a cryptographic address hash of the first cryptographic address using the cryptographic public key of the first cryptographic address, the cryptographic address hash being a common representation of the first entity on the first distributed blockchain network and the cryptographic address hash being derived via a cryptographic one-way hash function, the cryptographic one-way hash function following a protocol of performing a function on the cryptographic public key, the cryptographic public key being used on the first distributed blockchain network and a second distributed blockchain network, the first distributed blockchain network and the second distributed blockchain network using the same elliptic curve. Address correlating module 116 may be configured to correlate the first cryptographic address of the first entity to the second cryptographic address using the cryptographic address hash of the first cryptographic address, the correlating indicate that the second cryptographic address is of the first entity.

Address hash generating module 118 may be configured to generate a plurality of ancillary cryptographic addresses using parameters the cryptographic public key address hash, and cryptographic address type.

In some cases, the first distributed blockchain network and the second distributed blockchain network comprise one or more of cryptocurrency-based networks, virtual assets, virtual currencies, digital currencies, and cryptographic ledgers.

Pair deriving module 120 may be configured to derive a common cryptographic key pair of the first cryptographic address and of the second cryptographic address. Pair determining module 122 may be configured to determine a plurality of cryptographic address generated from the cryptographic key pair by determining a connection to one or more cryptographic addresses on a plurality of other blockchains networks, the plurality of other blockchains networks sharing the common cryptographic key pair.

Node deploying module 124 may be configured to deploy a node to the first distributed blockchain network for receiving the first distributed blockchain network data.

Database generating module 126 may be configured to generate a database of cross-blockchain network of cryptographic addresses for the first entity associations, and probabilistic determinations about the entity.

Tracing module 128 may be configured to trace illicit activity that travels through the first distributed blockchain network and the second distributed blockchain network using the database of cross-blockchain network of cryptographic addresses for the first entity, the illicit activity being a transfer of funds for an illegal reason.

In some cases, the one or more computing platforms 102, may be communicatively coupled to the remote platform(s)

104. In some cases, the communicative coupling may include communicative coupling through a networked environment 130. The networked environment 130 may be a radio access network, such as LTE or 5G, a local area network (LAN), a wide area network (WAN) such as the Internet, or wireless LAN (WLAN), for example. It will be appreciated that this is not intended to be limiting, and that the scope of this disclosure includes implementations in which one or more computing platforms 102 and remote platform(s) 104 may be operatively linked via some other communication coupling. The one or more one or more computing platforms 102 may be configured to communicate with the networked environment 130 via wireless or wired connections. In addition, in an embodiment, the one or more computing platforms 102 may be configured to communicate directly with each other via wireless or wired connections. Examples of one or more computing platforms 102 may include, but is not limited to, smartphones, wearable devices, tablets, laptop computers, desktop computers, Internet of Things (IoT) device, or other mobile or stationary devices. In an embodiment, system 100 may also include one or more hosts or servers, such as the one or more remote platforms 104 connected to the networked environment 130 through wireless or wired connections. According to one embodiment, remote platforms 104 may be implemented in or function as base stations (which may also be referred to as Node Bs or evolved Node Bs (eNBs)). In other embodiments, remote platforms 104 may include web servers, mail servers, application servers, and the like. According to certain embodiments, remote platforms 104 may be stand-alone servers, networked servers, or an array of servers.

The one or more computing platforms 102 may include one or more processors 132 for processing information and executing instructions or operations. One or more processors 132 may be any type of general or specific purpose processor. In some cases, multiple processors 132 may be utilized according to other embodiments. In fact, the one or more processors 132 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In some cases, the one or more processors 132 may be remote from the one or more computing platforms 102, such as disposed within a remote platform like the one or more remote platforms 104 of FIG. 1.

The one or more processors 132 may perform functions associated with the operation of system 100 which may include, for example, precoding of antenna gain/phase parameters, encoding and decoding of individual bits forming a communication message, formatting of information, and overall control of the one or more computing platforms 102, including processes related to management of communication resources.

The one or more computing platforms 102 may further include or be coupled to a memory 134 (internal or external), which may be coupled to one or more processors 132, for storing information and instructions that may be executed by one or more processors 132. Memory 134 may be one or more memories and of any type suitable to the local application environment and may be implemented using any suitable volatile or nonvolatile data storage technology such as a semiconductor-based memory device, a magnetic memory device and system, an optical memory device and system, fixed memory, and removable memory. For example, memory 134 can consist of any combination of random-access memory (RAM), read only memory (ROM), static storage such as a magnetic or optical disk, hard disk drive (HDD), or any other type of non-transitory machine or computer readable media. The instructions stored in memory 134 may include program instructions or computer program code that, when executed by one or more processors 132, enable the one or more computing platforms 102 to perform tasks as described herein.

In some embodiments, one or more computing platforms 102 may also include or be coupled to one or more antennas 136 for transmitting and receiving signals and/or data to and from one or more computing platforms 102. The one or more antennas 136 may be configured to communicate via, for example, a plurality of radio interfaces that may be coupled to the one or more antennas 136. The radio interfaces may correspond to a plurality of radio access technologies including one or more of LTE, 5G, WLAN, Bluetooth, near field communication (NFC), radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

Figure 2A:
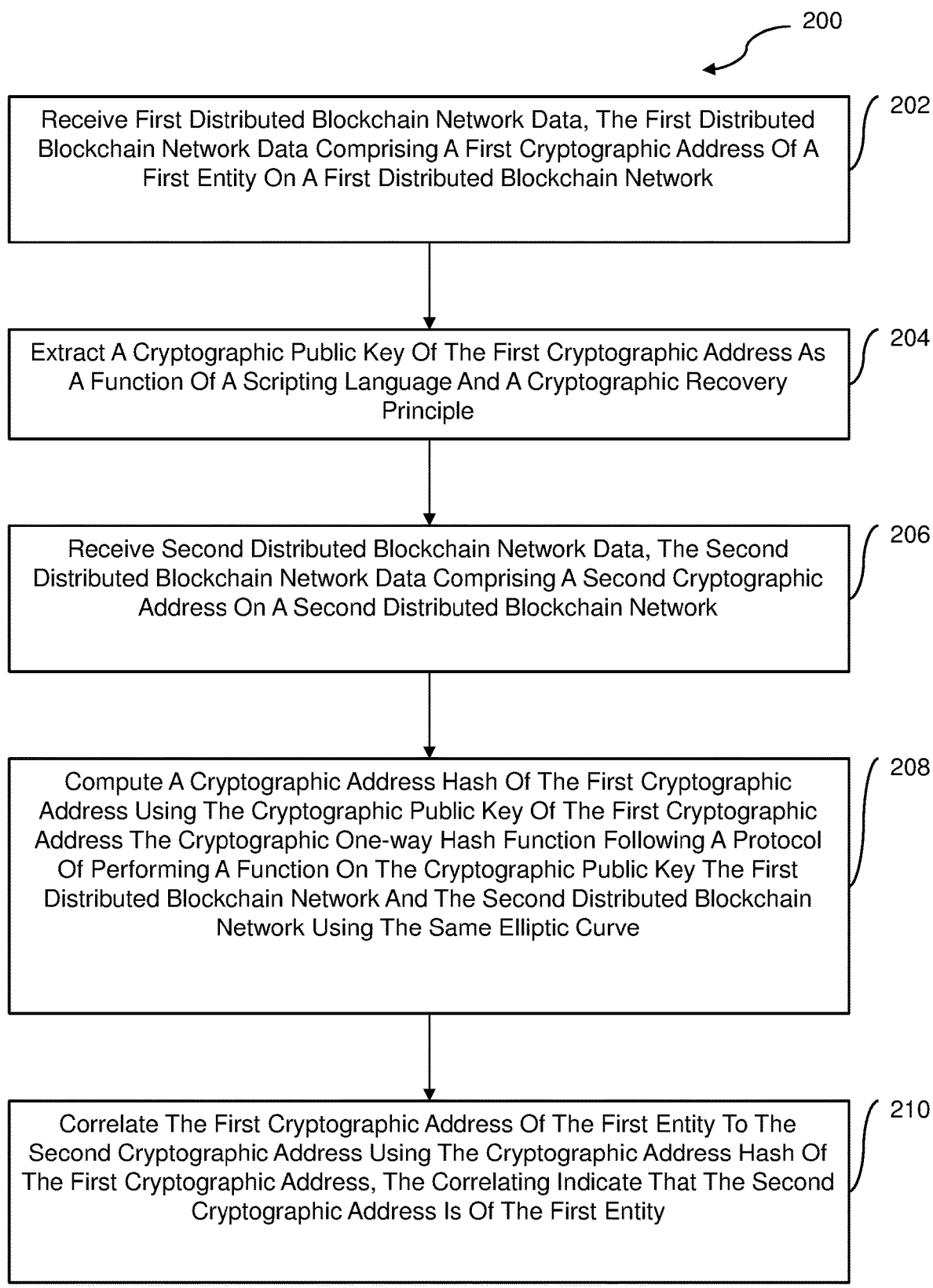
FIG. 2A, FIG. 2B, FIG. 2C, FIG. 2D, FIG. 2E and FIG. 2F illustrate a method for determining cryptographic address for a same entity across a plurality of distributed blockchain networks that use a same elliptic curve, according to exemplary embodiments of the present technology.
Figure 2B:
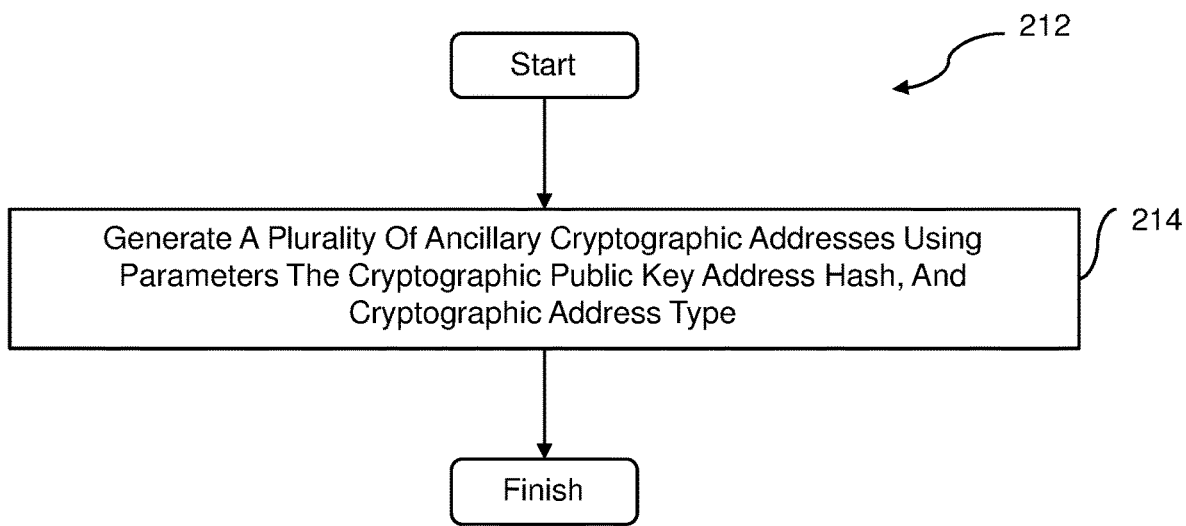
Figure 2C:
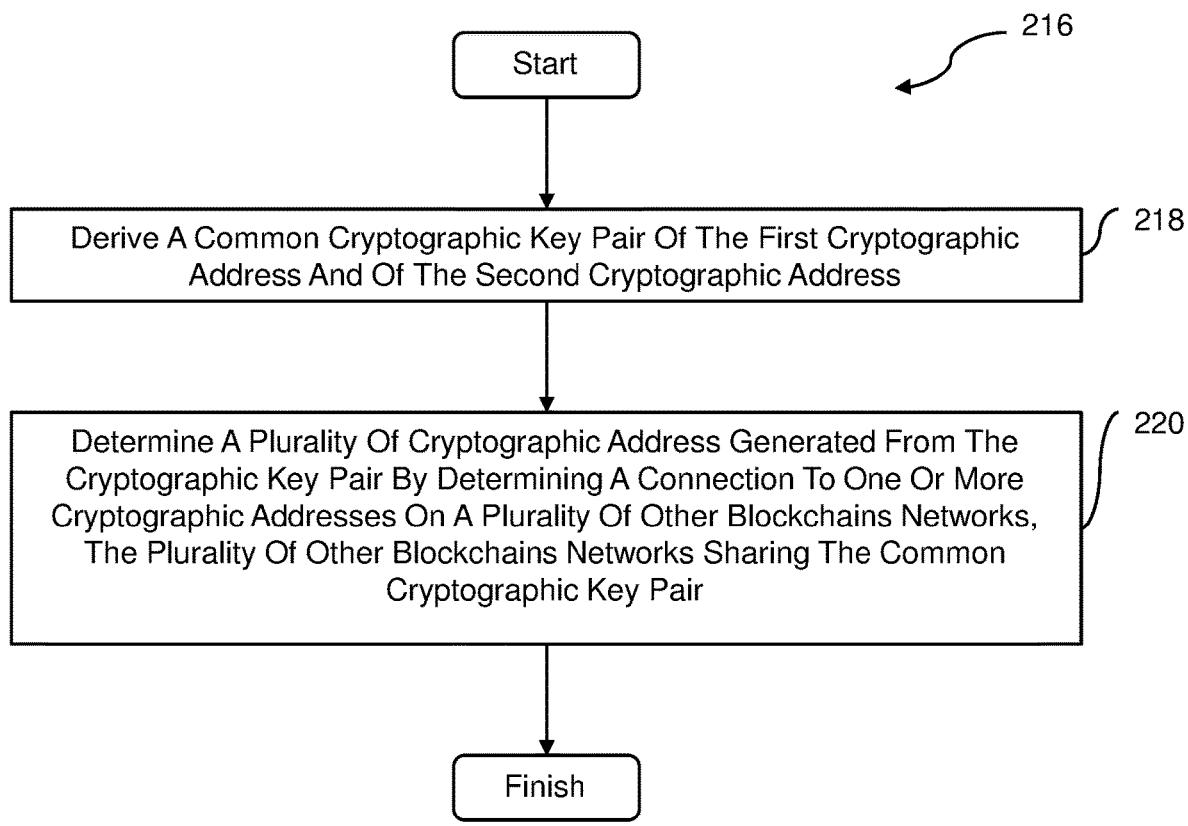
Figure 2D:
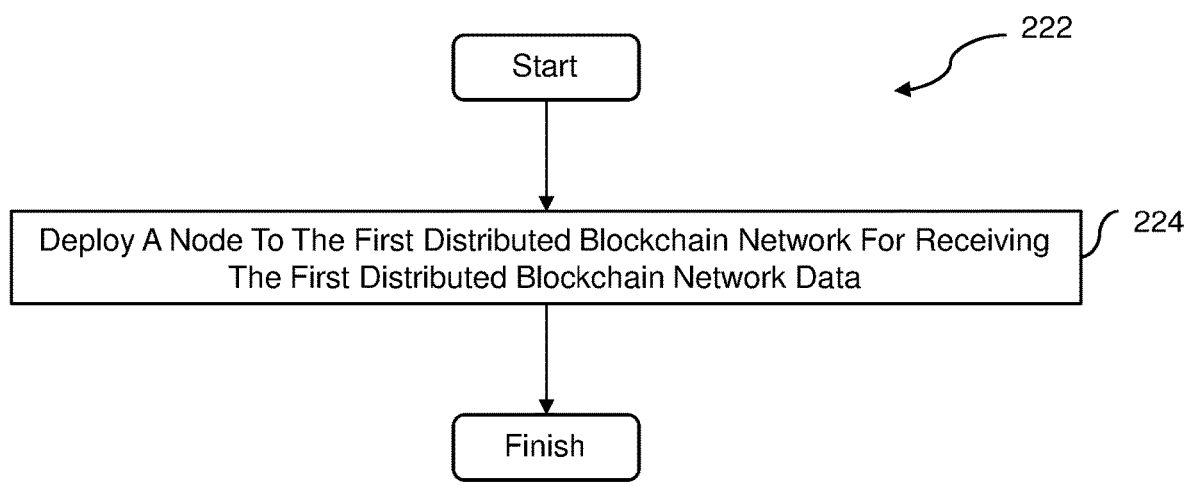
Figure 2E:
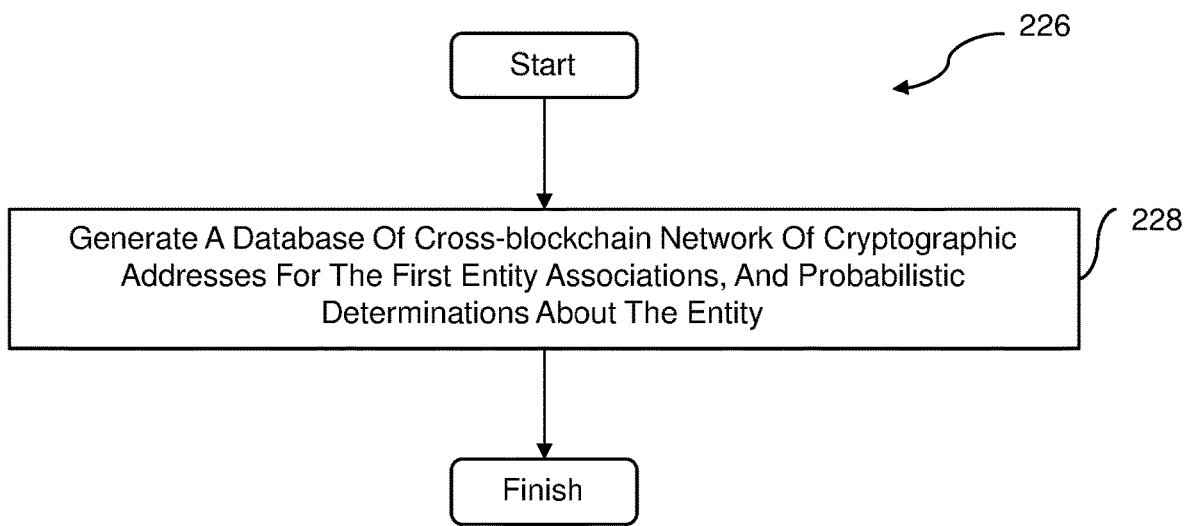
Figure 2F:
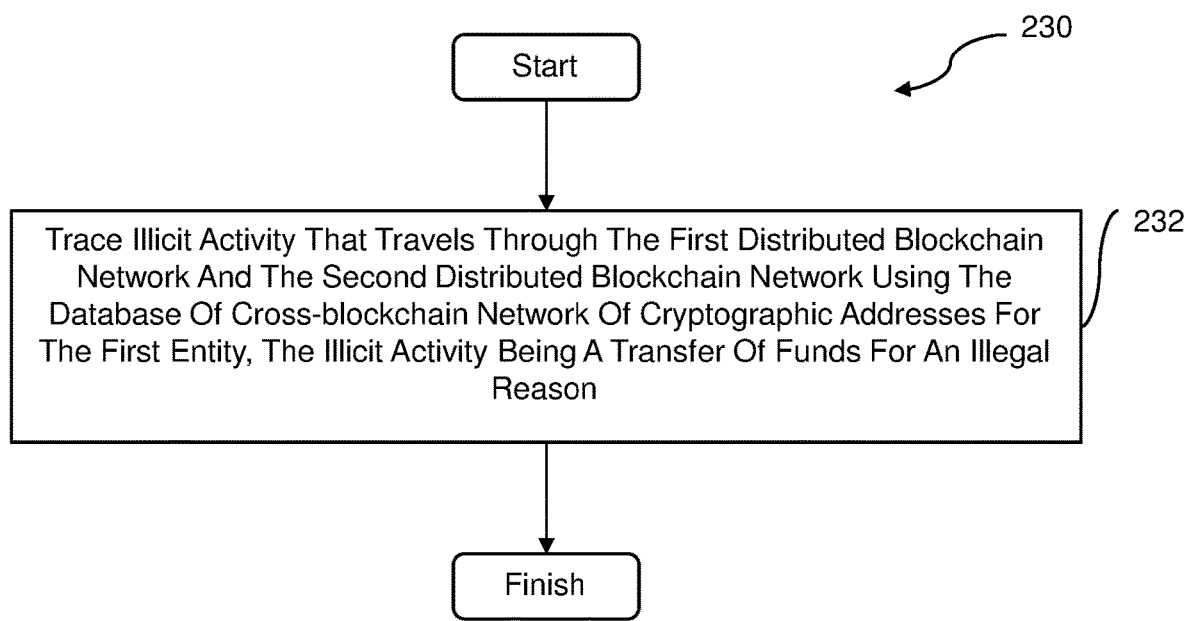

FIG. 2A, FIG. 2B, FIG. 2C, FIG. 2D, FIG. 2E and/or FIG. 2F illustrate an example flow diagram of a method 200, according to one embodiment. The method 200 may include receiving first distributed blockchain network data, the first distributed blockchain network data comprising a first cryptographic address of a first entity on a first distributed blockchain network at block 202. The method 200 may include extracting a cryptographic public key of the first cryptographic address as a function of a scripting language and a cryptographic recovery principle at block 204. The method 200 may include receiving second distributed blockchain network data, the second distributed blockchain network data comprising a second cryptographic address on a second distributed blockchain network at block 206. The method 200 may include computing a cryptographic address hash of the first cryptographic address using the cryptographic public key of the first cryptographic address, the cryptographic address hash being a common representation of the first entity on the first distributed blockchain network and the cryptographic address hash being derived via a cryptographic one-way hash function, the cryptographic one-way hash functioning following a protocol of performing a function on the cryptographic public key, the cryptographic public key being used on the first distributed blockchain network and a second distributed blockchain network, the first distributed blockchain network and the second distributed blockchain network using the same elliptic curve at block 208. The method 200 may include correlating the first cryptographic address of the first entity to the second cryptographic address using the cryptographic address hash of the first cryptographic address, the correlating indicating that the second cryptographic address is of the first entity at block 210.

In FIG. 2B, the method 200 may be continued at 212, and may further include generating a plurality of ancillary cryptographic addresses using parameters the cryptographic public key address hash, and cryptographic address type at block 214.

In FIG. 2C, the method 200 may be continued at 216, and may further include deriving a common cryptographic key pair of the first cryptographic address and of the second cryptographic address at block 218. The method 200 continued at 216 may also further include determining a plurality of cryptographic address generated from the cryptographic key pair by determining a connection to one or more cryptographic addresses on a plurality of other blockchains networks, the plurality of other blockchains networks sharing the common cryptographic key pair at block 220.

In FIG. 2D, the method 200 may be continued at 222, and may further include deploying a node to the first distributed blockchain network for receiving the first distributed blockchain network data at block 224.

In FIG. 2E, the method 200 may be continued at 226, and may further include generating a database of cross-blockchain network of cryptographic addresses for the first entity associations, and probabilistic determinations about the entity at block 228.

In FIG. 2F, the method 200 may be continued at 230, and may further include tracing illicit activity that travels through the first distributed blockchain network and the second distributed blockchain network using the database of cross-blockchain network of cryptographic addresses for the first entity, the illicit activity being a transfer of funds for an illegal reason at block 232.

In some cases, the method 200 may be performed by one or more hardware processors, such as the processors 132 of FIG. 1, configured by machine-readable instructions, such as the machine-readable instructions 106 of FIG. 1. In this aspect, the method 200 may be configured to be implemented by the modules, such as the modules 108, 110, 112, 114, 116, 118, 120, 122, 124, 126 and/or 128 discussed above in FIG. 1.

Figure 3:
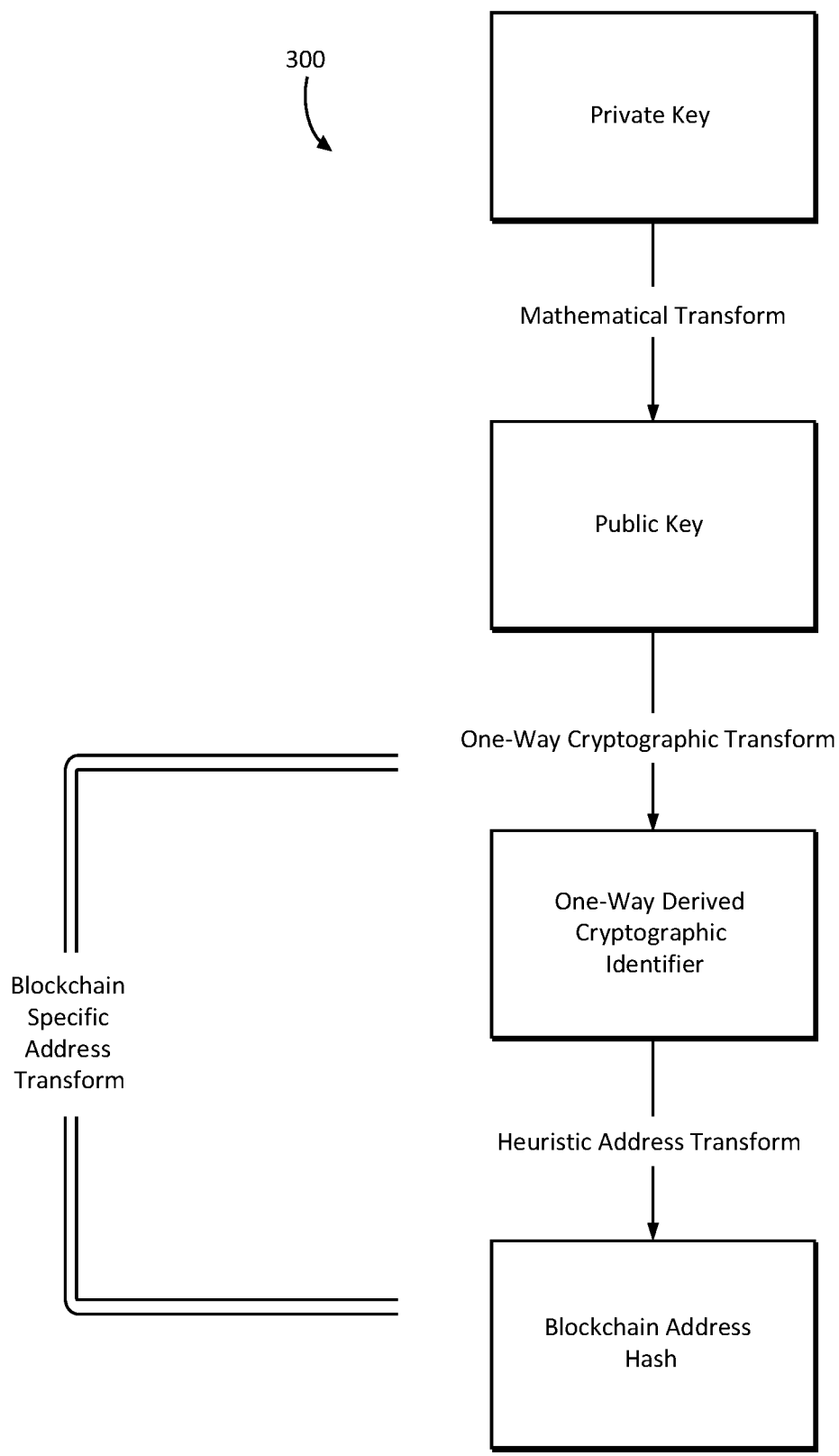
FIG. 3 is a block diagram showing use of public key/private key pairs in association with blockchain address generation, according to exemplary embodiments of the present technology.

FIG. 3 is a block diagram 300 showing use of public key/private key pairs in association with blockchain specific address generation, according to exemplary embodiments of the present technology. The block diagram 300, shows a private key transformed to a public key using a mathematical transformation ("transform"). More generally, a transformation means a mathematical function. For example, a transformation may be an invertible function from a set X to itself, or from X to another set Y. The public key is transformed to a one-way derived cryptographic identifier using a one-way cryptographic transformation. The one-way derived cryptographic identifier is transformed to blockchain address hash using a heuristic address transformation, which is a blockchain specific address transformation. Examples of the transformations (e.g., functions) used in the block diagram 300 of FIG. 3 are shown below in table 400 of FIG. 4.

Figure 4:
FIG. 4 is a table showing a representation of transforms outlined in FIG. 3 for specific cryptocurrencies, according to exemplary embodiments of the present technology.

FIG. 4 is a table 400 showing a representation of the transforms outlined in FIG. 3 for specific cryptocurrencies, according to exemplary embodiments of the present technology. For example, the mathematical transform Secp256k1 is used for cryptocurrencies Bitcoin, BitcoinCash, Litecoin, and the like, and is also used for cryptocurrencies Ethereum, Binance Chain, Rootstock, Cosmos, and the like. For example, Secp256k1 is the name of the elliptic curve used by Bitcoin to implement its public key cryptography. All points on this curve are valid Bitcoin public keys. When a user wishes to generate a public key using their private key, they multiply their private key, a large number, by the Generator Point, a defined point on the Secp256k1 curve. Thanks to the Discrete Log Problem, dividing a public key by the Generator Point cannot yield a private key. For example, the one-way cryptographic transformation RIPEMD-160(SHA256(PublicKey)) is used for cryptocurrencies Bitcoin, BitcoinCash, Litecoin, and the like. Furthermore, the one-way cryptographic transformation Keccak256 Hash(PublicKey) is used for cryptocurrencies Ethereum, Binance Chain, Rootstock, Cosmos, and the like.

For example, the heuristic address transformation Base58Encode(VersionByte+OneWay-Result) is used for cryptocurrencies Bitcoin, BitcoinCash, Litecoin, and the like. Furthermore, the heuristic address transformation subtract last N bytes is used for cryptocurrencies Ethereum, Binance Chain, Rootstock, Cosmos, and the like.

Figure 5:
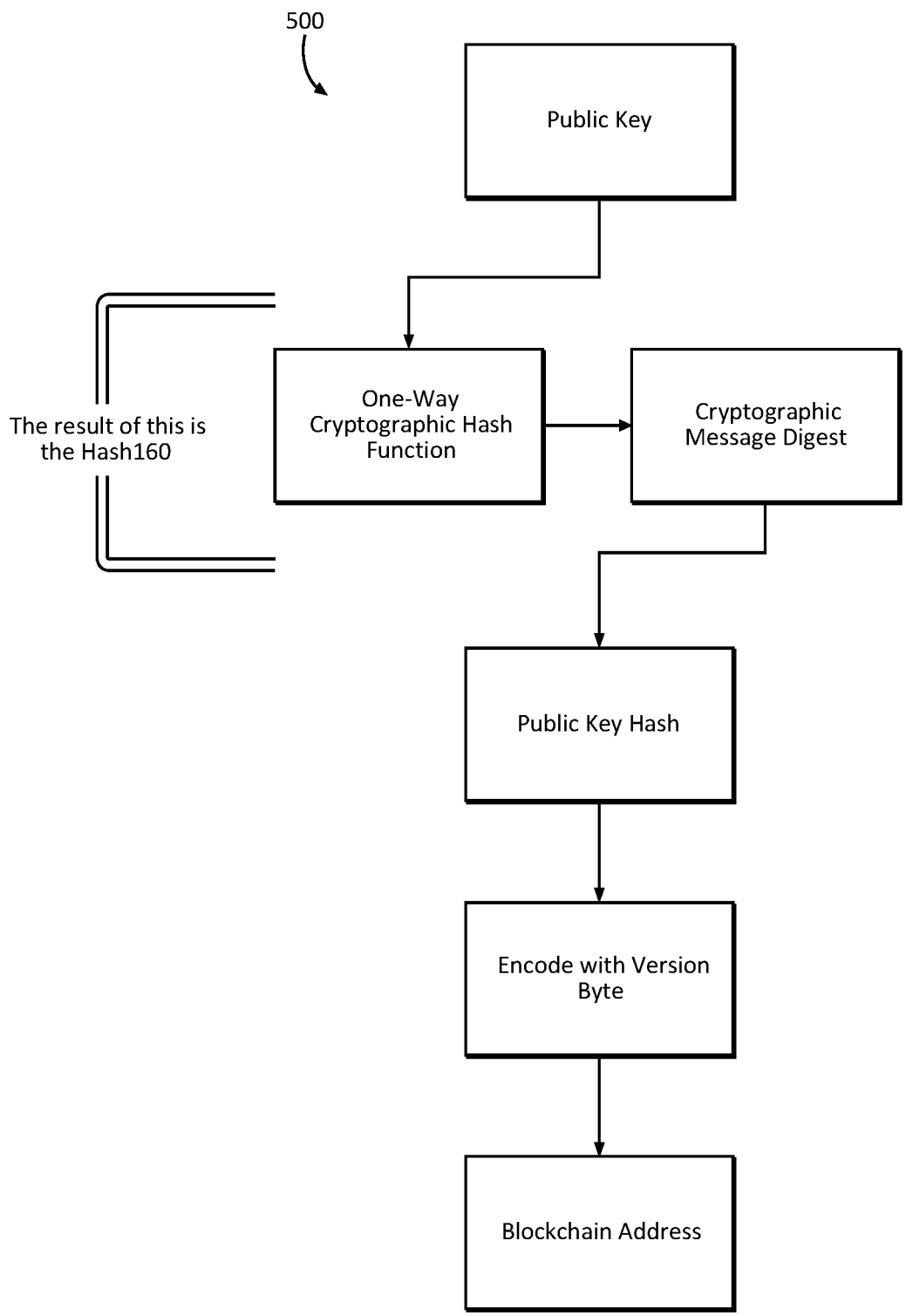
FIG. 5 is a block diagram showing Unspent Transaction Output (UTXO) model-based blockchain address generation, according to exemplary embodiments of the present technology.

FIG. 5 is a block diagram 500 showing Unspent Transaction Output (UTXO) model-based blockchain address generation, according to exemplary embodiments of the present technology. The block diagram 500 shows blockchain address generation using the Unspent Transaction Output (UTXO) model. The public keys proceeds to the one-way cryptographic hash function. The one-way cryptographic hash function proceeds to the cryptographic message digest. The result of this is the Hash160. For example, the Hash160 class provides methods for hashing data first with SHA-256 and feeding that result into the RIPEMD-160 hash. The cryptographic message digest proceed to the public key hash. The public key hash proceeds to the encoding with version byte. The encoding with version byte proceeds with the blockchain address generation.

Figure 6:
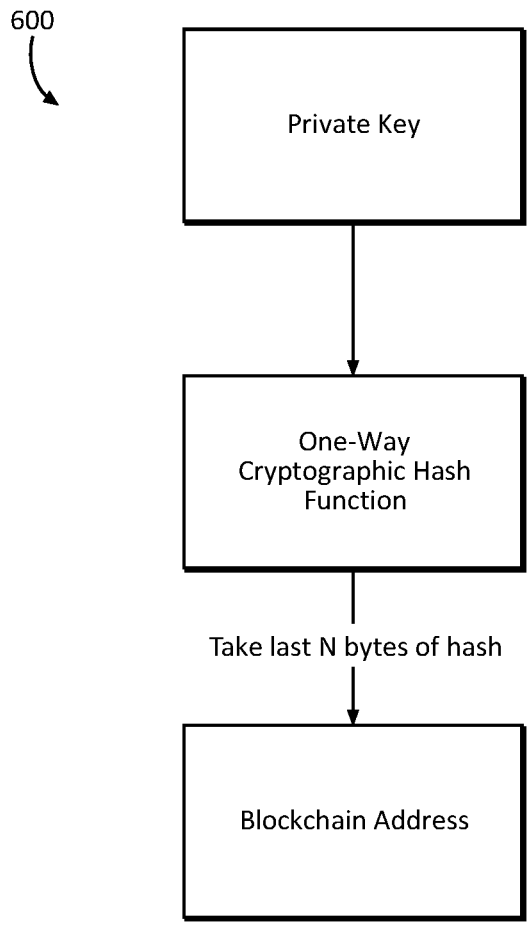
FIG. 6 is a block diagram showing account-based model blockchain address generation, according to exemplary embodiments of the present technology.

FIG. 6 is a block diagram 600 showing account-based model blockchain address generation, according to exemplary embodiments of the present technology. The block diagram 600 shows blockchain address generation using the account-based model. For example, public key proceed to the one-way cryptographic hash function. The one-way cryptographic hash function proceeds to the blockchain address generation by taking the last N bytes of the hash in various embodiments.

Figure 7:
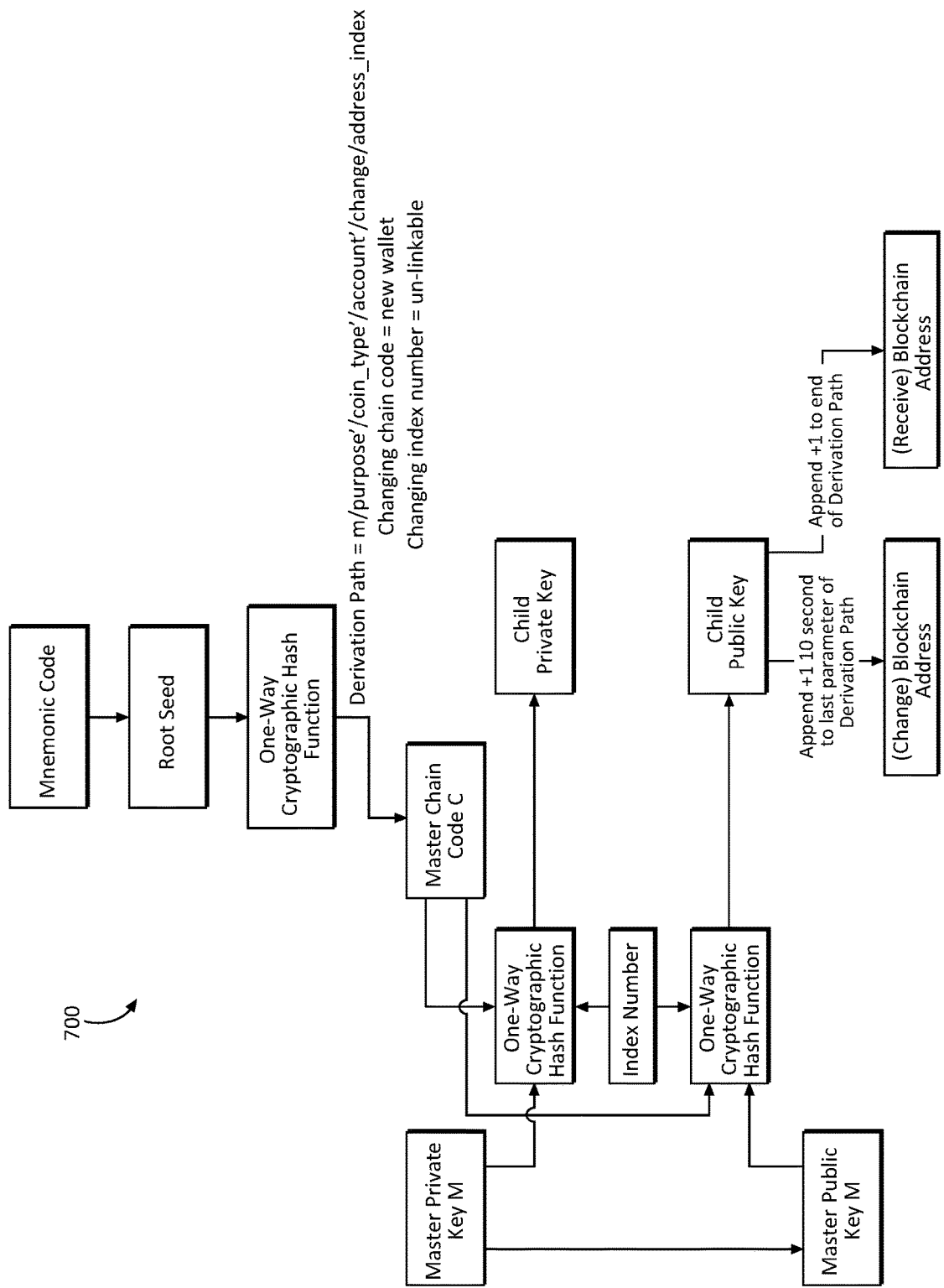
FIG. 7 is a block diagram showing Hierarchical Deterministic (HD) Key derivation for both Unspent Transaction Output (UTXO) models and account-based models, according to exemplary embodiments of the present technology.

FIG. 7 is a block diagram 700 showing Hierarchical Deterministic (HD) Key derivation for both Unspent Transaction Output (UTXO) models and account-based models, according to exemplary embodiments of the present technology.

Figure 8:
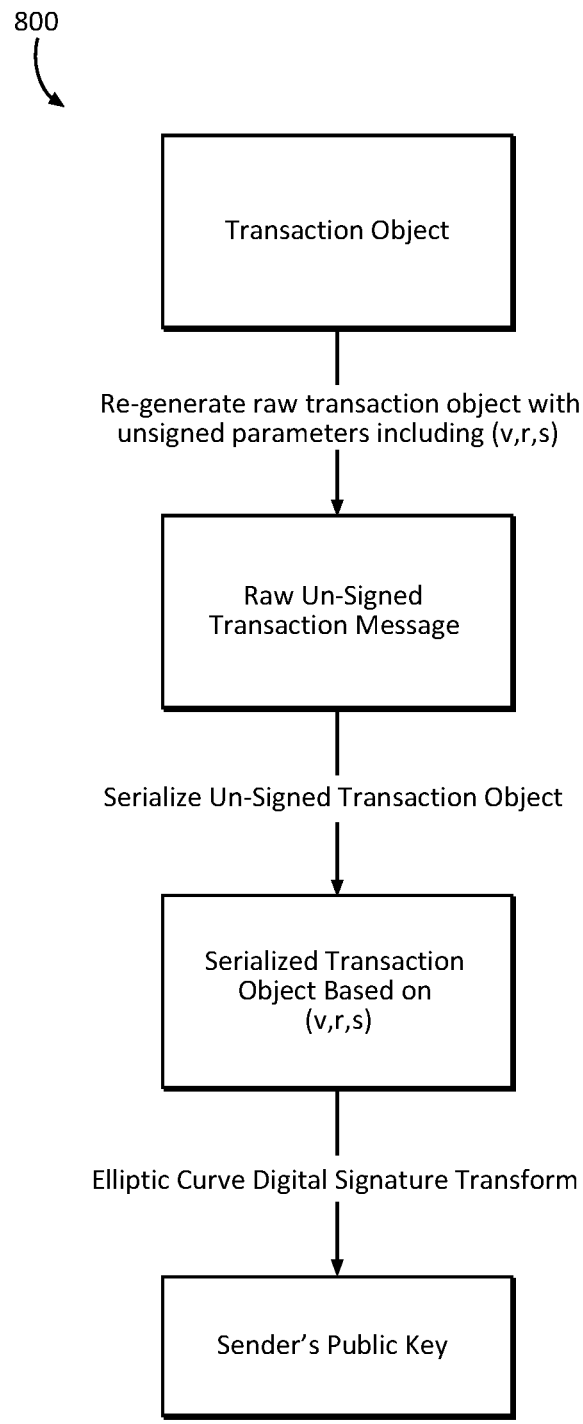
FIG. 8 account-based model public key abstraction, according to exemplary embodiments of the present technology.

FIG. 8 is a block diagram 800 showing account-based model public key abstraction, according to exemplary embodiments of the present technology. The block diagram 800 shows Sender's Public Key by abstraction. Transaction object proceeds to a raw unsigned transaction message by re-generating raw transaction object with unsigned parameters including (v, r, s). The Raw unsigned transaction message proceeds to the Serialized transaction object based on (v, r, s) using the serial un-singed transaction object. The Serialized transaction object based on (v, r, s) proceeds to the sender's Public Key using the elliptic curve digital signature transform.

Figure 9:
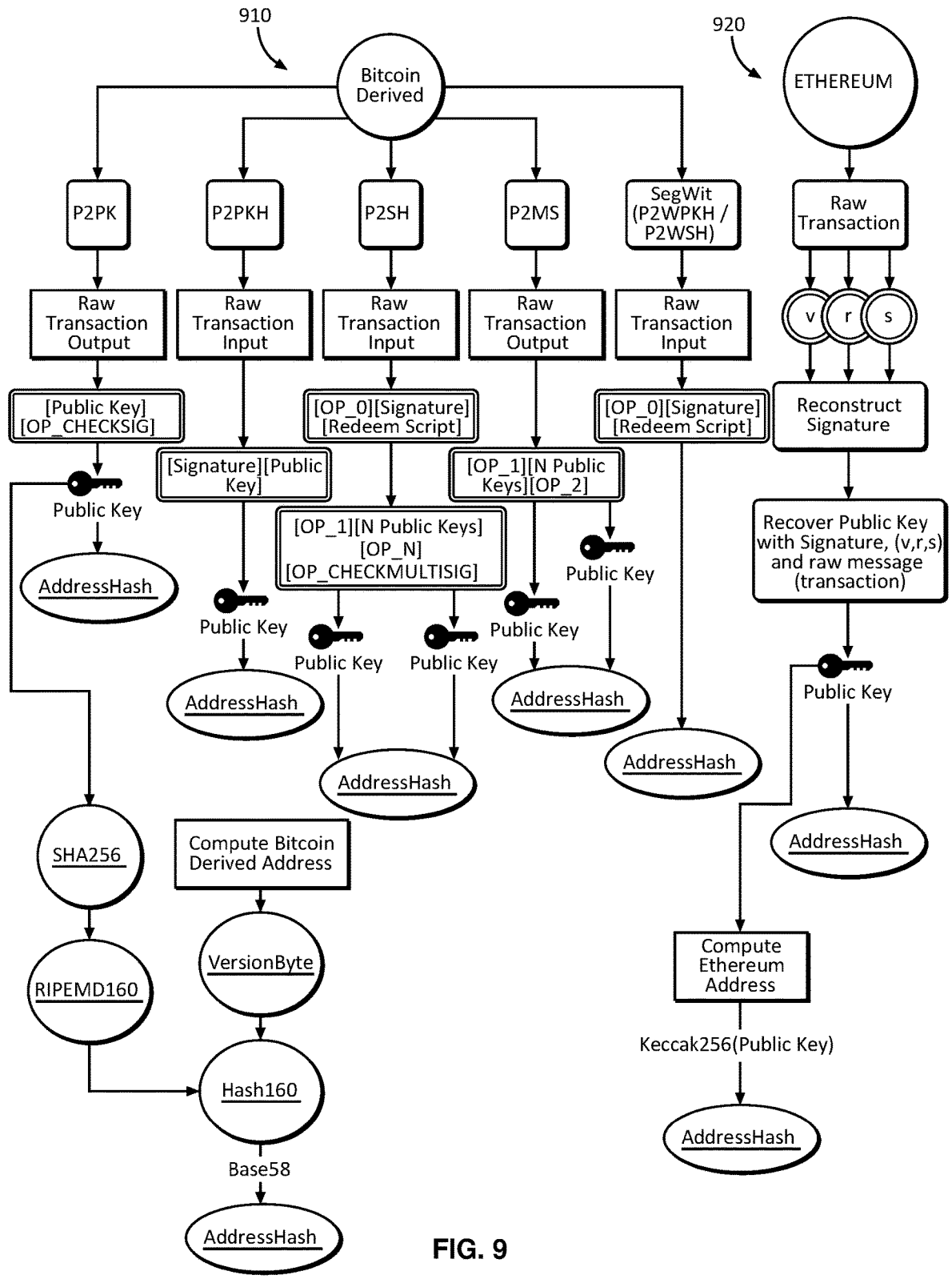
FIG. 9 is a diagram showing examples of cross-chain derivation with Bitcoin and Ethereum, according to exemplary embodiments of the present technology.

FIG. 9 is a block diagram showing examples of cross-chain derivation with Bitcoin and Ethereum, according to exemplary embodiments of the present technology. The block diagram of FIG. 9 shows a method of Bitcoin derivation 910. The block diagram of FIG. 9 further shows a method of Ethereum derivation 920.

Figure 10:
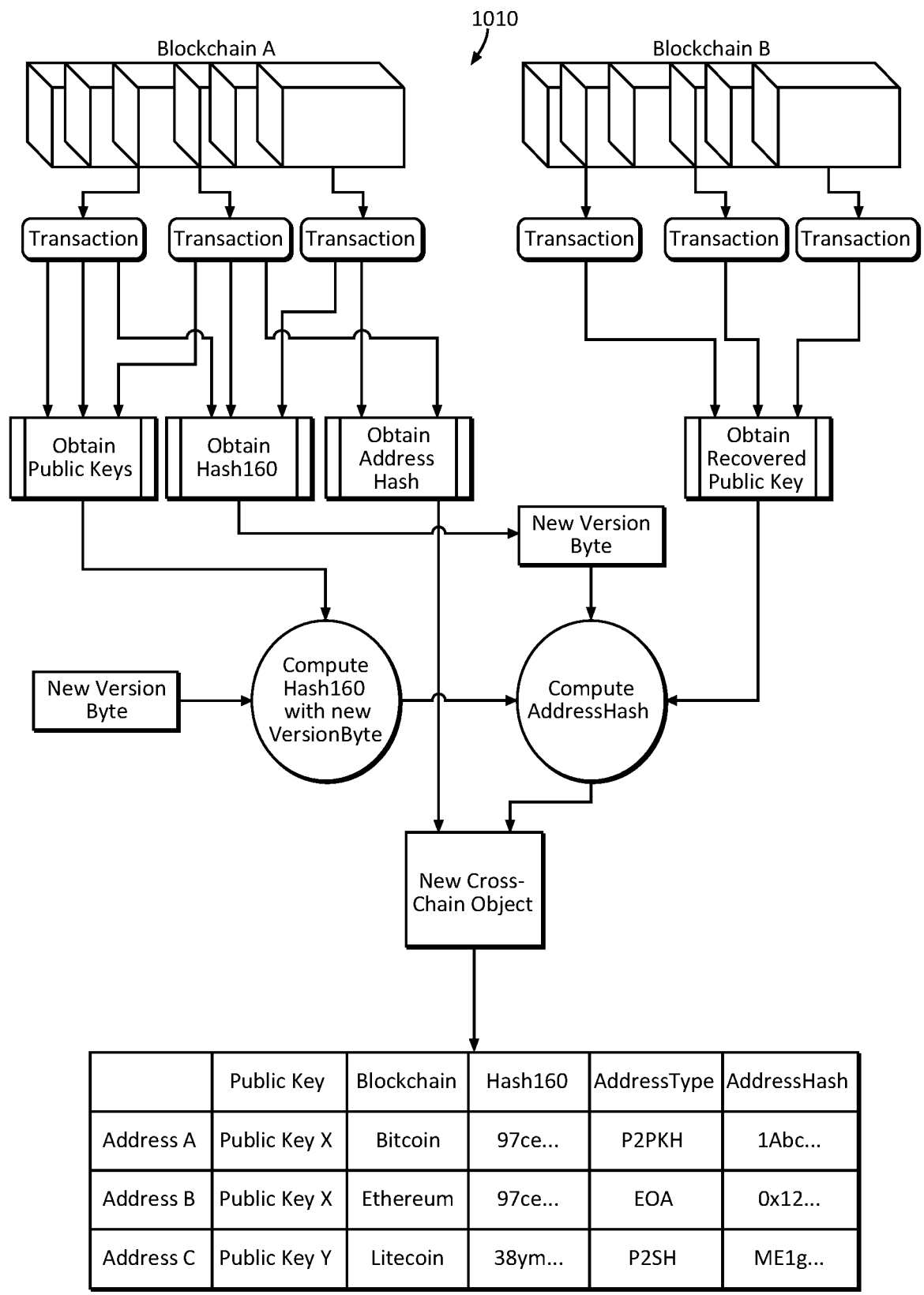
FIG. 10 is a block diagram showing a cross-chain address key clustering system, according to exemplary embodiments of the present technology.

FIG. 10 is a block diagram 1010 showing a cross-chain address key clustering system, according to exemplary embodiments of the present technology. For example, the result of the method shown in block diagram 1010 results in the parameters for a series of addresses (e.g., Address A, Address B, Address C, and so forth). For example, generating a plurality of ancillary cryptographic addresses using parameters, the parameters comprising: a script pattern, the cryptographic public key, hash160, address hash, and cryptographic address type.

EXAMPLES

Example 1 includes a system comprising: receiving first distributed blockchain network data, the first distributed blockchain network data comprising a first cryptographic address of a first entity on a first distributed blockchain network, extracting a cryptographic public key of the first cryptographic address as a function of a scripting language and a cryptographic recovery principle, receiving second distributed blockchain network data, the second distributed blockchain network data comprising a second cryptographic address on a second distributed blockchain network, computing a cryptographic address hash of the first cryptographic address using the cryptographic public key of the first cryptographic address, the cryptographic address hash being a common representation of the first entity on the first distributed blockchain network and the cryptographic address hash being derived via a cryptographic one-way hash function, the cryptographic one-way hash functioning following a protocol of performing a function on the cryptographic public key, the cryptographic public key being used on the first distributed blockchain network and a second distributed blockchain network, the first distributed blockchain network and the second distributed blockchain network using the same elliptic curve and correlating the first cryptographic address of the first entity to the second cryptographic address using the cryptographic address hash of the first cryptographic address, the correlating indicating that the second cryptographic address is of the first entity.

Example 2 includes the system of example(s) 1 and/or some other example(s) herein, further comprising: generating a plurality of ancillary cryptographic addresses using parameters, the parameters comprising: a script pattern, the cryptographic public key, hash160, address hash, and cryptographic address type. For example, see the method shown in block diagram 1010 resulting in the parameters for a series of cryptographic blockchain addresses.

Example 3 includes the system of example(s) 1 and/or some other example(s) herein, wherein the first distributed blockchain network and the second distributed blockchain network comprise one or more of cryptocurrency-based networks, virtual assets, virtual currencies, digital currencies, and cryptographic ledgers.

Example 4 includes the system of example(s) 1 and/or some other example(s) herein, further comprising: deriving a common cryptographic key pair of the first cryptographic address and of the second cryptographic address; and determining a plurality of cryptographic address generated from the cryptographic key pair by determining a connection to one or more cryptographic addresses on a plurality of other blockchains networks, the plurality of other blockchains networks sharing the common cryptographic key pair.

Example 5 includes the system of example(s) 1 and/or some other example(s) herein, further comprising: deploying a node to the first distributed blockchain network for receiving the first distributed blockchain network data.

Example 6 includes the system of example(s) 1 and/or some other example(s) herein, further comprising: generating a database of cross-blockchain network of cryptographic addresses for the first entity, the database of cross-blockchain network of cryptographic addresses for the first entity enabling clustering, associations, and probabilistic determinations about the entity.

Example 7 includes the system of example(s) 6 and/or some other example(s) herein, further comprising: tracing illicit activity that travels through the first distributed blockchain network and the second distributed blockchain network using the database of cross-blockchain network of cryptographic addresses for the first entity, the illicit activity being a transfer of funds for an illegal reason.

Example 8 includes a storage medium comprising: receiving first distributed blockchain network data, the first distributed blockchain network data comprising a first cryptographic address of a first entity on a first distributed blockchain network, extracting a cryptographic public key of the first cryptographic address as a function of a scripting language and a cryptographic recovery principle, receiving second distributed blockchain network data, the second distributed blockchain network data comprising a second cryptographic address on a second distributed blockchain network, computing a cryptographic address hash of the first cryptographic address using the cryptographic public key of the first cryptographic address, the cryptographic address hash being a common representation of the first entity on the first distributed blockchain network and the cryptographic address hash being derived via a cryptographic one-way hash function, the cryptographic one-way hash functioning following a protocol of performing a function on the cryptographic public key, the cryptographic public key being used on the first distributed blockchain network and a second distributed blockchain network, the first distributed blockchain network and the second distributed blockchain network using the same elliptic curve and correlating the first cryptographic address of the first entity to the second cryptographic address using the cryptographic address hash of the first cryptographic address, the correlating indicating that the second cryptographic address is of the first entity.

Example 9 includes the storage medium of example(s) 8 and/or some other example(s) herein, further comprising: generating a plurality of ancillary cryptographic addresses using parameters, the parameters comprising: a script pattern, the cryptographic public key, hash160, address hash, and cryptographic address type.

Example 10 includes the storage medium of example(s) 8 and/or some other example(s) herein, wherein the first distributed blockchain network and the second distributed blockchain network comprise one or more of cryptocurrency-based networks, virtual assets, virtual currencies, digital currencies, and cryptographic ledgers.

Example 11 includes the storage medium of example(s) 8 and/or some other example(s) herein, further comprising: deriving a common cryptographic key pair of the first cryptographic address and of the second cryptographic address; and determining a plurality of cryptographic address generated from the cryptographic key pair by determining a connection to one or more cryptographic addresses on a plurality of other blockchains networks, the plurality of other blockchains networks sharing the common cryptographic key pair.

Example 12 includes the storage medium of example(s) 8 and/or some other example(s) herein, further comprising: deploying a node to the first distributed blockchain network for receiving the first distributed blockchain network data.

Example 13 includes the storage medium of example(s) 8 and/or some other example(s) herein, further comprising: generating a database of cross-blockchain network of cryptographic addresses for the first entity, the database of cross-blockchain network of cryptographic addresses for the first entity enabling clustering, associations, and probabilistic determinations about the entity.

Example 14 includes the storage medium of example(s) 13 and/or some other example(s) herein, further comprising: tracing illicit activity that travels through the first distributed blockchain network and the second distributed blockchain network using the database of cross-blockchain network of cryptographic addresses for the first entity, the illicit activity being a transfer of funds for an illegal reason.

Figure 11:
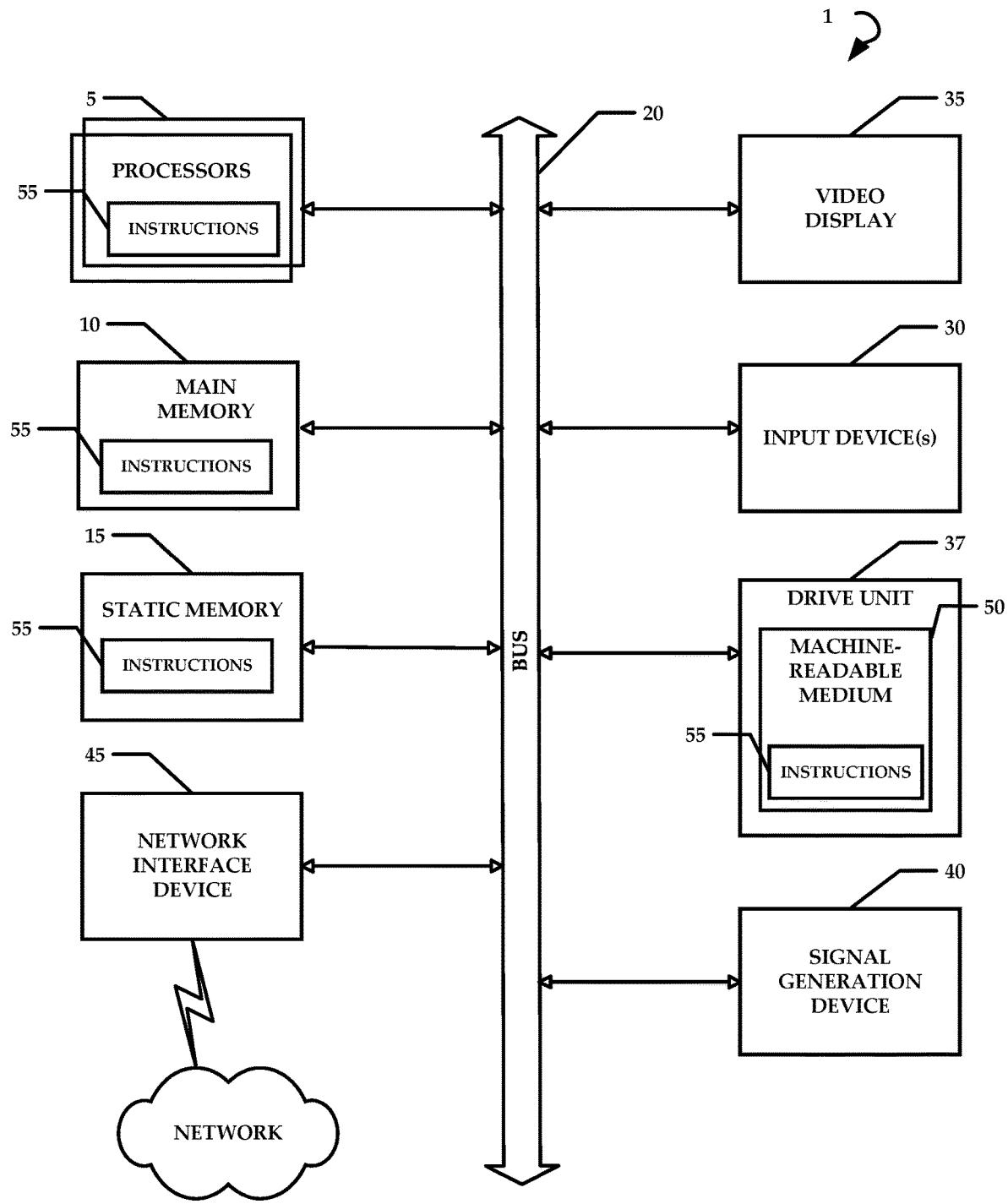
FIG. 11 illustrates an exemplary computer system that may be used to implement embodiments of the present technology.

FIG. 11 illustrates an exemplary computer system that may be used to implement embodiments of the present technology. FIG. 11 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiments in many different forms, there is shown in the drawings and has been described in detail several specific embodiments with the understanding that the present disclosure is to be considered as an exemplification of the principles of the technology and is not intended to limit the technology to the embodiments illustrated.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system for determining a cryptographic address for a same entity across a plurality of distributed blockchain networks, the system comprising:

a processor configured by machine-readable instructions to:

receive first distributed blockchain network data, the first distributed blockchain network data comprising a first cryptographic address of a first entity on a first distributed blockchain network;

extract a cryptographic public key of the first cryptographic address as a function of a scripting language and a cryptographic recovery principle;

receive second distributed blockchain network data, the second distributed blockchain network data comprising a second cryptographic address on a second distributed blockchain network;

compute a cryptographic address hash of the first cryptographic address using the cryptographic public key of the first cryptographic address; and correlate the first cryptographic address of the first entity to the second cryptographic address using the cryptographic address hash of the first cryptographic address, the correlating indicating that the second cryptographic address is of the first entity, wherein the correlating is based at least partially on the first distributed blockchain network and the second distributed blockchain network using a same elliptic curve.

2. The system of claim 1, wherein the cryptographic public key is derived from a private key of the first entity using the elliptic curve.

3. The system of claim 1, wherein the first distributed blockchain network and the second distributed blockchain network comprise one or more of cryptocurrency-based networks, virtual assets, virtual currencies, digital currencies, and cryptographic ledgers.

4. The system of claim 1, wherein the cryptographic address hash is a common representation of the first entity on the first distributed blockchain network and the cryptographic address hash is derived via a cryptographic one-way hash function.

5. The system of claim 4, wherein the cryptographic one-way hash function follows a protocol of performing a function on the cryptographic public key.

6. The system of claim 1, wherein the cryptographic public key is used on the first distributed blockchain network and the second distributed blockchain network.

7. The system of claim 1, wherein the processor is further configured by machine-readable instructions to: trace illicit activity that travels through the first distributed blockchain network and the second distributed blockchain network using a database of cross-blockchain network of cryptographic addresses for the first entity, the illicit activity being a transfer of funds for an illegal reason.

8. A non-transient computer-readable storage medium comprising instructions being executable by a processor to perform a method for determining a cryptographic address for a same entity across a plurality of distributed blockchain networks, the method comprising:

receiving first distributed blockchain network data, the first distributed blockchain network data comprising a first cryptographic address of a first entity on a first distributed blockchain network;

extracting a cryptographic public key of the first cryptographic address as a function of a scripting language and a cryptographic recovery principle;

receiving second distributed blockchain network data, the second distributed blockchain network data comprising a second cryptographic address on a second distributed blockchain network;

computing a cryptographic address hash of the first cryptographic address using the cryptographic public key of the first cryptographic address; and correlating the first cryptographic address of the first entity to the second cryptographic address using the cryptographic address hash of the first cryptographic address, the correlating indicating that the second cryptographic address is of the first entity, wherein the correlating is based at least partially on the first distributed blockchain network and the second distributed blockchain network using a same elliptic curve.

9. The computer-readable storage medium of claim 8, wherein the cryptographic public key is derived from a private key of the first entity using the elliptic curve.

10. The computer-readable storage medium of claim 8, wherein the first distributed blockchain network and the second distributed blockchain network comprise one or more of cryptocurrency-based networks, virtual assets, virtual currencies, digital currencies, and cryptographic ledgers.

11. The computer-readable storage medium of claim 8, wherein the cryptographic address hash is a common representation of the first entity on the first distributed blockchain network and the cryptographic address hash is derived via a cryptographic one-way hash function.

12. The computer-readable storage medium of claim 11, wherein the cryptographic one-way hash function follows a protocol of performing a function on the cryptographic public key.

13. The computer-readable storage medium of claim 8, wherein the cryptographic public key is used on the first distributed blockchain network and the second distributed blockchain network.

14. The computer-readable storage medium of claim 8, wherein the method further comprises tracing illicit activity that travels through the first distributed blockchain network and the second distributed blockchain network using a database of cross-blockchain network of cryptographic addresses for the first entity, the illicit activity being a transfer of funds for an illegal reason.

15. A method for determining a cryptographic address for a same entity across a plurality of distributed blockchain networks, the method comprising:

receiving first distributed blockchain network data, the first distributed blockchain network data comprising a first cryptographic address of a first entity on a first distributed blockchain network;

extracting a cryptographic public key of the first cryptographic address as a function of a scripting language and a cryptographic recovery principle;

receiving second distributed blockchain network data, the second distributed blockchain network data comprising a second cryptographic address on a second distributed blockchain network;

computing a cryptographic address hash of the first cryptographic address using the cryptographic public key of the first cryptographic address; and correlating the first cryptographic address of the first entity to the second cryptographic address using the cryptographic address hash of the first cryptographic address, the correlating indicating that the second cryptographic address is of the first entity, wherein the correlating is based at least partially on the first distributed blockchain network and the second distributed blockchain network using a same elliptic curve.

16. The method of claim 15, wherein cryptographic public key is derived from a private key of the first entity using the elliptic curve.

17. The method of claim 15, wherein the first distributed blockchain network and the second distributed blockchain network comprise one or more of cryptocurrency-based networks, virtual assets, virtual currencies, digital currencies, and cryptographic ledgers.

18. The method of claim 15, wherein the cryptographic address hash is a common representation of the first entity on the first distributed blockchain network and the cryptographic address hash is derived via a cryptographic one-way hash function.

19. The method of claim 18, wherein the cryptographic one-way hash function follows a protocol of performing a function on the cryptographic public key, wherein the cryptographic public key is used on the first distributed blockchain network and the second distributed blockchain network.

20. The method of claim 15, further comprising tracing illicit activity that travels through the first distributed blockchain network and the second distributed blockchain network using a database of cross-blockchain network of cryptographic addresses for the first entity, the illicit activity being a transfer of funds for an illegal reason.

* * * * *